(12) United States Patent
Takemoto et al.

(10) Patent No.: US 7,812,871 B2
(45) Date of Patent: Oct. 12, 2010

(54) INDEX IDENTIFICATION METHOD AND APPARATUS

(75) Inventors: Kazuki Takemoto, Kawasaki (JP); Kiyohide Satoh, Kawasaki (JP); Shinji Uchiyama, Yokohama (JP); Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 929 days.

(21) Appl. No.: 11/610,805

(22) Filed: Dec. 14, 2006

(65) Prior Publication Data

US 2007/0139322 A1 Jun. 21, 2007

(30) Foreign Application Priority Data

Dec. 15, 2005 (JP) .............................. 2005-362370

(51) Int. Cl.
*H04N 9/077* (2006.01)
*G06K 9/00* (2006.01)

(52) U.S. Cl. ...................................... 348/286; 382/154
(58) Field of Classification Search ................. 348/286; 382/153, 106, 166, 286
See application file for complete search history.

(56) References Cited

U.S. PATENT DOCUMENTS

| | | | |
|---|---|---|---|
| 6,956,503 B2 * | 10/2005 | Yokokohji et al. | 340/988 |
| 7,467,061 B2 * | 12/2008 | Satoh et al. | 702/150 |
| 7,580,027 B2 * | 8/2009 | Satoh et al. | 345/156 |
| 2003/0107569 A1 | 6/2003 | Endo et al. | |
| 2004/0183898 A1 | 9/2004 | Endo et al. | |
| 2005/0069172 A1 * | 3/2005 | Uchiyama | 382/100 |
| 2005/0069174 A1 * | 3/2005 | Uchiyama et al. | 382/103 |
| 2005/0069196 A1 * | 3/2005 | Uchiyama et al. | 382/154 |
| 2005/0253871 A1 * | 11/2005 | Anabuki et al. | 345/633 |
| 2005/0264433 A1 * | 12/2005 | Yokokohji et al. | 340/937 |
| 2007/0024712 A1 | 2/2007 | Morita et al. | |
| 2007/0139321 A1 | 6/2007 | Takemoto et al. | |
| 2007/0242899 A1 * | 10/2007 | Satoh et al. | 382/286 |
| 2009/0022369 A1 * | 1/2009 | Satoh et al. | 382/106 |

FOREIGN PATENT DOCUMENTS

| | | |
|---|---|---|
| JP | 11-084307 | 3/1999 |
| JP | 2000-041173 | 2/2000 |

OTHER PUBLICATIONS

Kato, et al., "An Augmented Reality System and its Calibration based on Marker Tracking", Transactions of the Virtual Reality Society of Japan, vol. 4, No. 4, pp. 607-616, Dec. 1999.
A. State, et al.: "Superior Augmented Reality Registration by Integrating Landmark Tracking and Magnetic Tracking", Proc. SIGGRAPH '96, pp. 429-438, Jul. 1996.

(Continued)

*Primary Examiner*—Kelly L Jerabek
(74) *Attorney, Agent, or Firm*—Fitzpatrick, Cella, Harper & Scinto

(57) ABSTRACT

The orientation of each index is estimated from a sensed image, and the index detected from the image is identified based on the orientation of an image sensing device and that of the index estimated from known coordinate information of the index. In this way, indices which are located at nearby positions but have different orientations are never misidentified, and can be stably identified. Indices can be stably identified from the sensed image in which indices located in the physical space appear.

8 Claims, 18 Drawing Sheets

OTHER PUBLICATIONS

X. Zhang, et al.: "Visual Marker Detection and Decoding in AR systems: A Comparative Study", Proc. of International Symposium on Mixed and Augmented Reality (ISMAR'02), 2002.

J. Rekimoto, "Matrix: A Realtime Object Identification and Registration Method for Augmented Reality", Proc. of Asia Pacific Computer Human Interaction (APCHI '98), 1998.

* cited by examiner

F I G. 5
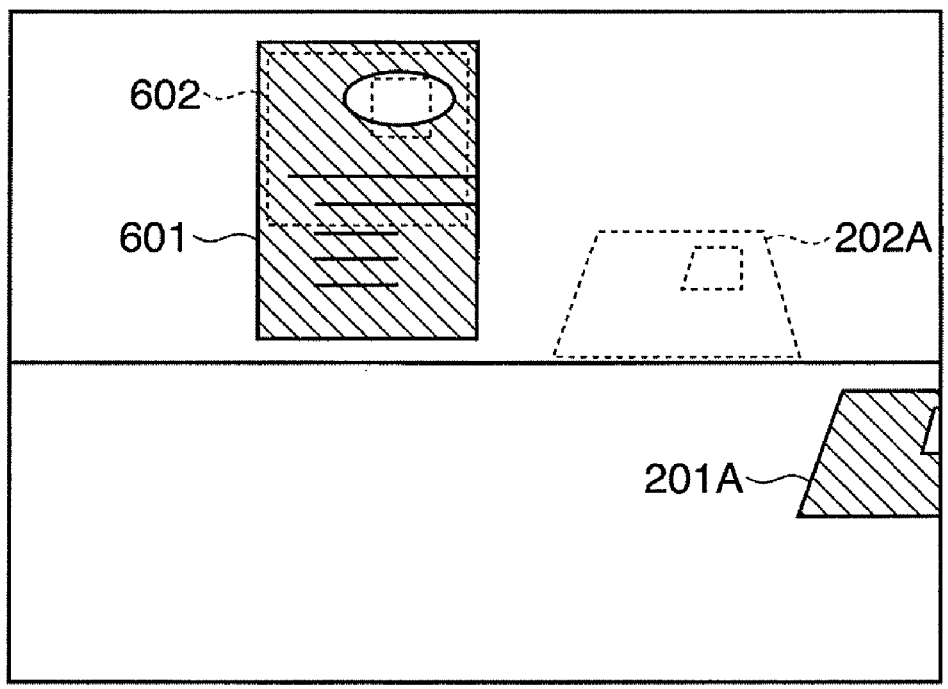

F I G. 12
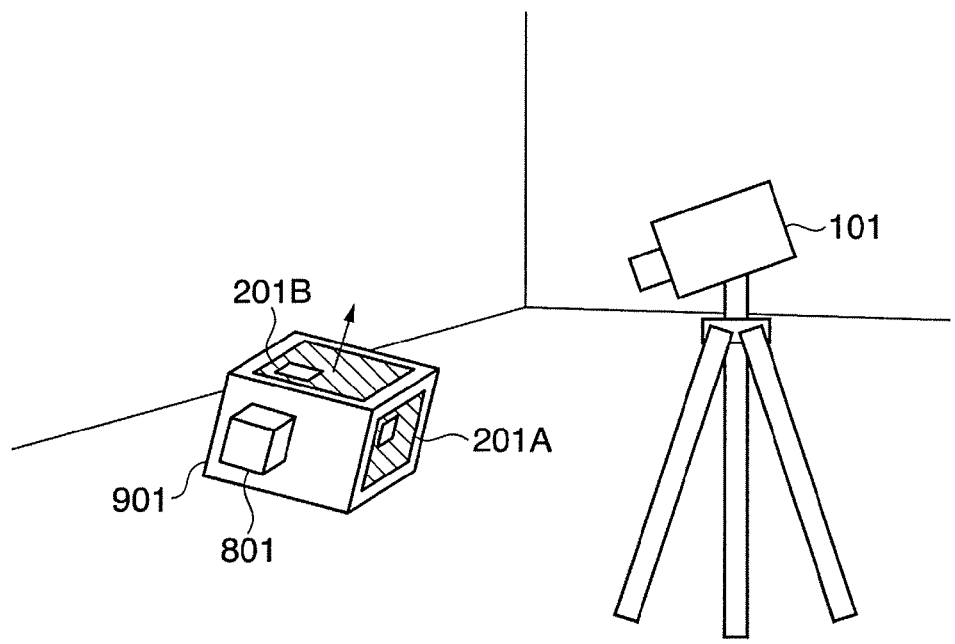

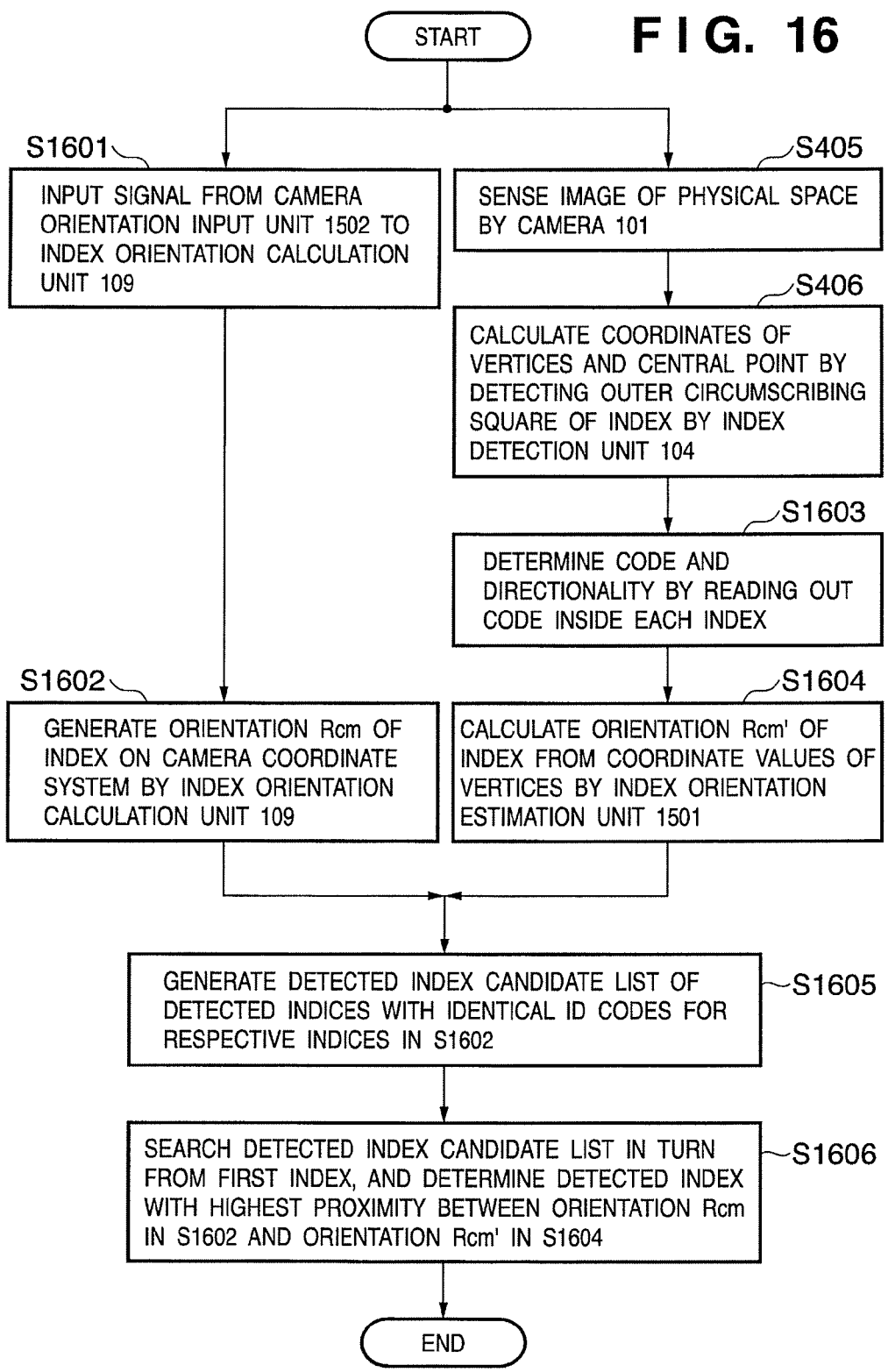

INDEX IDENTIFICATION METHOD AND APPARATUS

BACKGROUND OF THE INVENTION

1. Field of the Invention

The present invention relates to a technique for detecting and identifying an index located in physical space from an image obtained by sensing the physical space.

2. Description of the Related Art

[Prior Art 1]

For example, a mixed reality (MR) system that combines and displays physical and virtual space requires position and orientation measurement of an image sensing unit (to be also referred to as a camera hereinafter) that senses an image of physical space. Conventionally, upon measuring the position and orientation of the image sensing unit by a position and orientation sensor, there is a known technique for correcting the measurement result using indices (for example, objects having specific shapes and colors) which are located in advance in the physical space and whose positions are known (see Japanese Patent Laid-Open No. 11-084307, Japanese Patent Laid-Open No. 2000-041173, and A. State, G. Hirota, D. T. Chen, B. Garrett, and M. Livingston: Superior augmented reality registration by integrating landmark tracking and magnetic tracking, Proc. SIGGRAPH '96, pp. 429-438, July 1996).

In other words, these methods estimate the position and orientation of the camera using a position and orientation sensor that measures the position and orientation of the camera and an image of indices sensed by the camera. As indices used in such methods, the barycenter of a region of a specific color, a concentric circle, and the like are known. Since a plurality of indices are often used simultaneously, the correspondence between the indices detected from the image sensed by the camera (to be referred to as detected indices hereinafter) and the plurality of indices located on the physical space must be identified. As one of the conventional index identification methods, it is known to use the relationship between:

the estimated coordinates of an index on an image (image sensing) plane, which are obtained from a projection calculation based on the known absolute position of the index and the measurement value of the position and orientation sensor; and the image coordinates of the index actually detected from the image.

[Prior Art 2]

On the other hand, as disclosed in:

Kato, Billinghurst, Asano, and Tachibana: Augmented Reality System and its Calibration based on Marker Tracking, Transactions of the Virtual Reality Society of Japan vol. 4, no. 4, pp. 607-616, December 1999;

X. Zhang, S. Fronz, and N. Navab: Visual marker detection and decoding in AR systems: A comparative study, Proc. of International Symposium on Mixed and Augmented Reality (ISMAR'02), 2002; and Junichi Rekimoto, "Matrix: A Realtime Object Identification and Registration Method for Augmented Reality", Proc. of Asia Pacific Computer Human Interaction (APCHI '98), 1998, a method of estimating the position and orientation of the camera using only an image of indices sensed by the camera without using any position and orientation sensors is known. These references use a square index and measure (estimate) the position and orientation of the camera based on the coordinates of the four vertices of the square. However, since a square has rotational symmetry for every 90° with respect to an axis that passes through its center (the intersection of the diagonal lines) and is perpendicular to its plane as a rotation axis, the directionality of each index cannot be discriminated from only the vertex coordinates in the image. For this reason, another feature (e.g., a directional pattern) used to discriminate the directionality of the index is provided in the index. Furthermore, when a plurality of indices are used, since they need to be identified based only on the image sensed by the camera, graphic information such as unique patterns, symbols, or the like, which are different for respective indices, is embedded in each index.

[Prior Art 3]

When the camera position and orientation estimation method of prior art 1 uses a dot marker or concentric circle marker as an index, the information of one index is only one coordinate value. For this reason, the geometric information volume is small, and a method of simultaneously using a plurality of indices is adopted.

As described above, when a plurality of indices are used simultaneously, a method of identifying the correspondence between the sensed detected indices and those which are located in physical space must be devised. Especially, if the image features (features such as colors, shapes, and the like, which can be identified by image processing) of the indices are the same or have small differences, and a large number of indices exist, misidentification is likely to occur.

On the other hand, the square index used in prior art 2 must be embedded with code information unique to a marker or information which serves as a template so as to identify the upper, lower, left, and right directions. Since the index having such a complicated structure must be detected from the image, it cannot be identified as long as the index occupies a sufficiently large area in the sensed image plane.

In order to solve the aforementioned problems, such as misidentification due to the small information volume per index of prior art 1 and restrictions on the location conditions due to the complexity of the index of prior art 2, the following method may be adopted.

When indices of an identical type having directionality are located in physical space like in prior art 2, the directionality of each detected index on the image plane is compared with the estimated directionality of each index on the image plane, which is obtained by making a projection calculation using the position and orientation sensor. As a result, each index can be identified more simply and stably than in the prior art.

For example, as shown in FIG. 7, the directionality of an index 202A, which is obtained by a projection calculation using the position and orientation sensor, is compared with the directionalities of indices 201A and 201B on the image, which become candidates detected from the sensed image. In the example of FIG. 7, it is determined that the index 201A having the closer directionality corresponds to the index 202A. With this method, the index size can be reduced compared to that of prior art 2 and the restrictions on the location conditions can be relaxed even though an index having a larger information volume than prior art 1 is used.

The method of prior art 2 compares directionalities by projecting an index at a position on the image, which is calculated based on the value of the position and orientation sensor attached to the camera, and the absolute coordinates of the index, which are registered in advance. For this reason, there are restrictions as to the locations of a plurality of indices which may be sensed at the same time so that they may have different directionalities.

For example, when once index each is located on the floor and wall, as shown in FIG. 3, since indices 201A and 201B located on the floor and wall, respectively, have the same directionality in the sensed image, they may be misidentified depending on errors of the position and orientation sensor. For this reason, in order to avoid such locations, the directionality of either index must be changed.

That is, the method of prior art 3 has the limitation that when a plurality of indices are sensed close to each other, they must be located to allow sensing with different directionalities. In this case, even when indices are located on surfaces having different slopes in physical space as in the example of FIG. 3, a case wherein their directionalities are hard to distinguish on the sensed image must be taken into consideration.

Especially, when a large number of indices are located in a small region having a plurality of inclined surfaces (the floor and wall, or a solid body having a large number of inclined surfaces) densely, it is not easy to locate them in consideration of the directionalities upon image sensing. For this reason, the number of indices which can be located in a region where they are likely to be sensed at the same time is limited.

Assume that an index 201A is located on the wall, and printed matter 601 is located on the wall side, as shown in FIG. 5. In such a situation, a partial region of the printed matter 601 on the wall may be erroneously detected as a detected index 602 due to factors such as camera noise and the like. In the sensed image shown in FIG. 5, the index 201A is not detected as an index, since it is cut at the end of the sensed image. As a result, when the directionality of a projected image 202A of the index 201A calculated by projection is similar to that of the erroneously detected index 602 on the image, the detected index 602 is misidentified as the index 201A. In this way, conventionally, the detected index 602, which is erroneously detected on the inclined surface different from an actual index, is misidentified.

SUMMARY OF THE INVENTION

The present invention has as its principal object to solve these conventional problems, and to provide an index identification method and apparatus which can identify an index with high precision.

According to an aspect of the present invention, there is provided an index identification method comprising: an image acquisition step of acquiring a sensed image obtained by sensing an image of a physical space in which a plurality of indices are located on a physical object; an index detection step of detecting at least one index from the sensed image; a first orientation estimation step of estimating an orientation of the detected index using the sensed image; an orientation information acquisition step of acquiring a measurement result of an orientation of at least one of an image sensing device used to sense the image and the physical object; a second orientation estimation step of estimating an orientation of at least one index based on the orientation measurement result of at least one of the image sensing device and the physical object acquired in the orientation information acquisition step, and information on the plurality of indices stored in a storage device; and an index identification step of identifying to which of the indices stored in the storage device the detected index corresponds using at least the orientation of the index estimated in the first orientation estimation step and the orientation estimated in the second orientation estimation step.

According to another aspect of the present invention, there is provided an index identification method comprising: an image acquisition step of acquiring a sensed image obtained by sensing an image of a physical space in which a plurality of indices are located on a physical object; an index detection step of detecting at least one index from the sensed image; a first orientation estimation step of estimating an orientation of the detected index using the sensed image; an orientation information acquisition step of acquiring a measurement result of an orientation of an image sensing device used to sense the image; a second orientation estimation step of estimating an orientation of at least one index based on the orientation measurement result of the image sensing device acquired in the orientation information acquisition step, and information on the plurality of indices stored in a storage device; and an index identification step of identifying to which of the indices stored in the storage device the detected index corresponds using at least the orientation of the index estimated in the first orientation estimation step and the orientation estimated in the second orientation estimation step.

According to a further aspect of the present invention, there is provided an index identification apparatus comprising: an image acquisition unit which acquires a sensed image obtained by sensing an image of a physical space on which a plurality of indices are located on a physical object; a storage unit which stores information of the plurality of indices; an index detection unit which detects at least one index from the sensed image; a first orientation estimation unit which estimates an orientation of the detected index using the sensed image; an orientation information acquisition unit which acquires a measurement result of an orientation of at least one of an image sensing device used to sense the image and the physical object; a second orientation estimation unit which estimates the orientation of at least one index based on the orientation measurement result of at least one image sensing device and the physical object acquired by the orientation information acquisition unit, and information of the plurality of indices stored in the storage unit; and an index identification unit which identifies to which indices stored in the storage unit the detected index corresponds using at least the orientation of the index estimated by the first orientation estimation unit and the orientation estimated by the second orientation estimation unit. According to yet further aspect of the present invention, there is provided an index identification apparatus comprising: an image acquisition unit which acquires a sensed image obtained by sensing an image of a physical space on which a plurality of indices are located on a physical object; a storage unit which stores information of a plurality of indices; an index detection unit which detects at least one index from the sensed image; a first orientation estimation unit which estimates an orientation of the detected index using the sensed image; an orientation information acquisition unit which acquires a measurement result of the orientation of an image sensing device used to sense the image; a second orientation estimation unit which estimates the orientation of at least one index based on the orientation measurement result of the image sensing device acquired by the orientation information acquisition unit, and information of the plurality of indices stored in the storage unit; and an index identification unit which identifies to which indices stored in the storage unit the detected index corresponds using at least the orientation of the index estimated by the first orientation estimation unit and the orientation estimated by the second orientation estimation unit.

With this arrangement, according to the present invention, since identification is made using orientation information of an index, the index can be identified with high precision.

Further features of the present invention will become apparent from the following description of exemplary embodiments with reference to the attached drawings.

BRIEF DESCRIPTION OF THE DRAWINGS

FIG. 5 is a view for explaining misidentification of an index due to its erroneous detection;

FIG. 12 is a view illustrating the relationship between a camera 101, physical object 901, and object position and orientation sensor 801 according to the first modification;

FIG. 16 is a flowchart for explaining the processing of the index identification apparatus according to the third modification.

DESCRIPTION OF THE EMBODIMENTS

Preferred embodiments of the present invention will now be described in detail in accordance with the accompanying drawings.

First Embodiment

Figure 1:
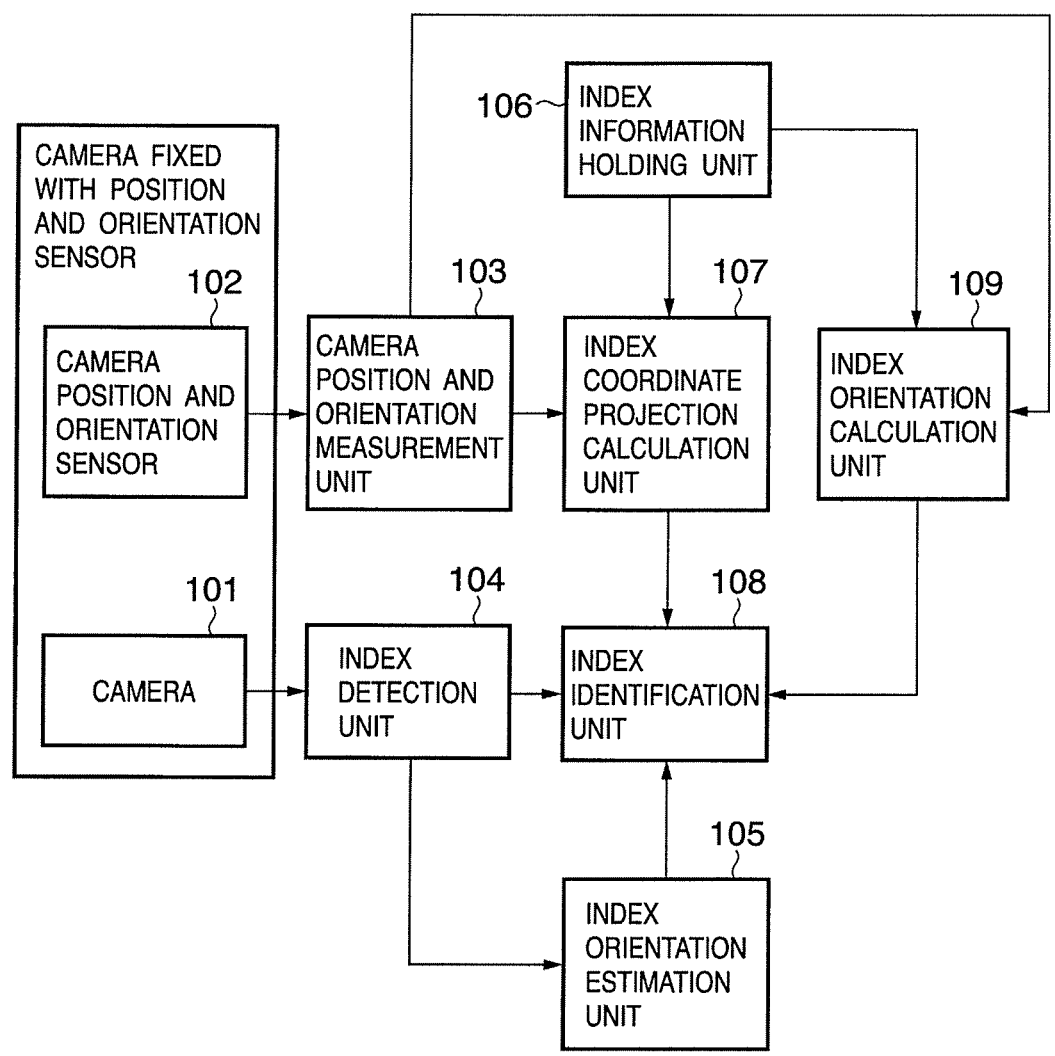
FIG. 1 is a block diagram showing an example of the arrangement of an index identification apparatus according to the first embodiment.

FIG. 1 is a block diagram showing an example of the arrangement of an index identification apparatus according to this embodiment.

An index to be identified by the index identification apparatus according to this embodiment is an index whose orientation on a reference coordinate system can be calculated from image information. This embodiment uses, as a preferred example of an index, the index described in prior art 2. That is, this embodiment uses an index which has a square outer shape, and in which a square (directionality specifying shape) with a largely different brightness from the remaining region is located at a position biased to one vertex inside the index like indices 201A and 201B shown in FIG. 2. In other words, this index is configured by the vertices of a square, and a directionality specifying shape (203A or 203B; to be referred to as a directionality specifying shape 203 hereinafter if it is indiscriminate) which uniquely specifies the upper, lower, right, and left directions. By registering the positional relationship of the directionality specifying shape 203 together with the location position of an index, the orientation of the index on a camera coordinate system can be calculated from the coordinate information of that index on the image.

Figure 6:
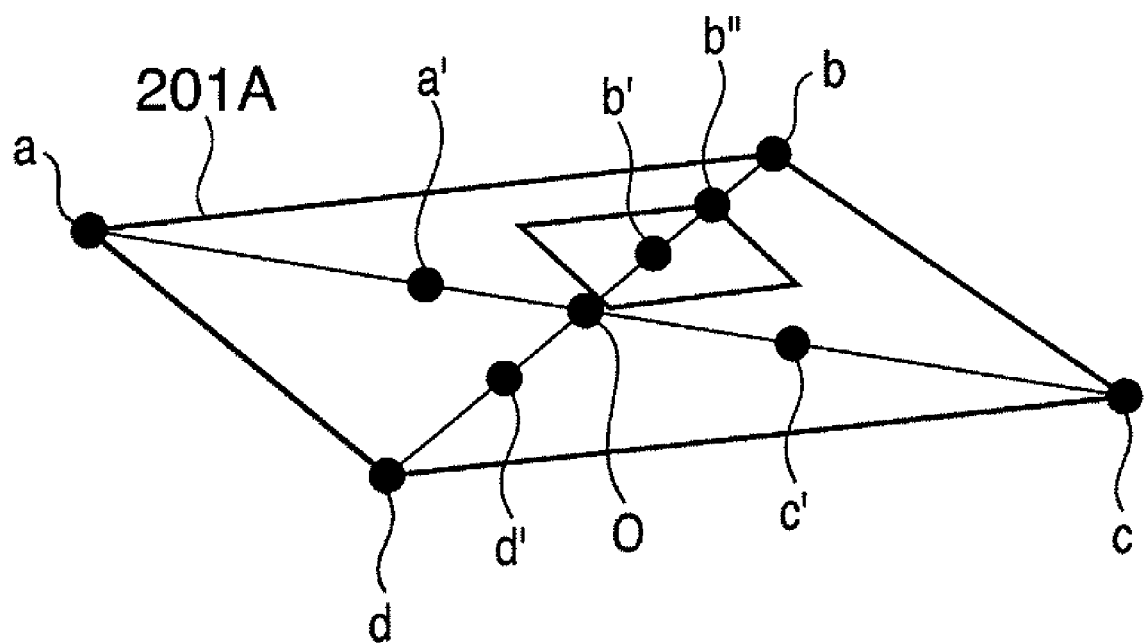
FIG. 6 is a view for explaining the configuration of an index and directionality detection processing according to the first embodiment.
Figure 7:
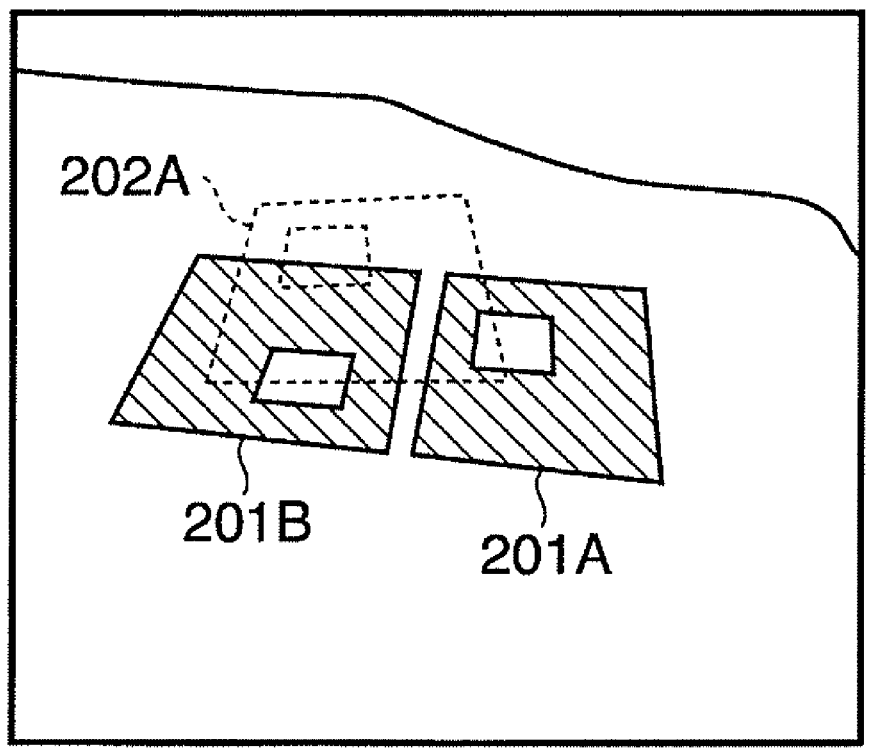
FIG. 7 is a view for explaining an identification technique of an index using the directionality.

In the index of this embodiment, as shown in FIG. 6, the directionality specifying shape 203 is located to have one of its vertices match a central point O of a square which forms the index outer shape, and to have a diagonal vertex b" at a position ⅔ the distance from the central point O to a specific vertex, i.e., a vertex b. With such location, if the area of an index that occupies the sensed image becomes small, the interval between the index outer shape and directionality specifying shape outer shape is maintained, and the center of the directionality specifying shape can be seen as much as possible upon acquiring the brightness of an inner square as the directionality specifying shape.

Figure 2:
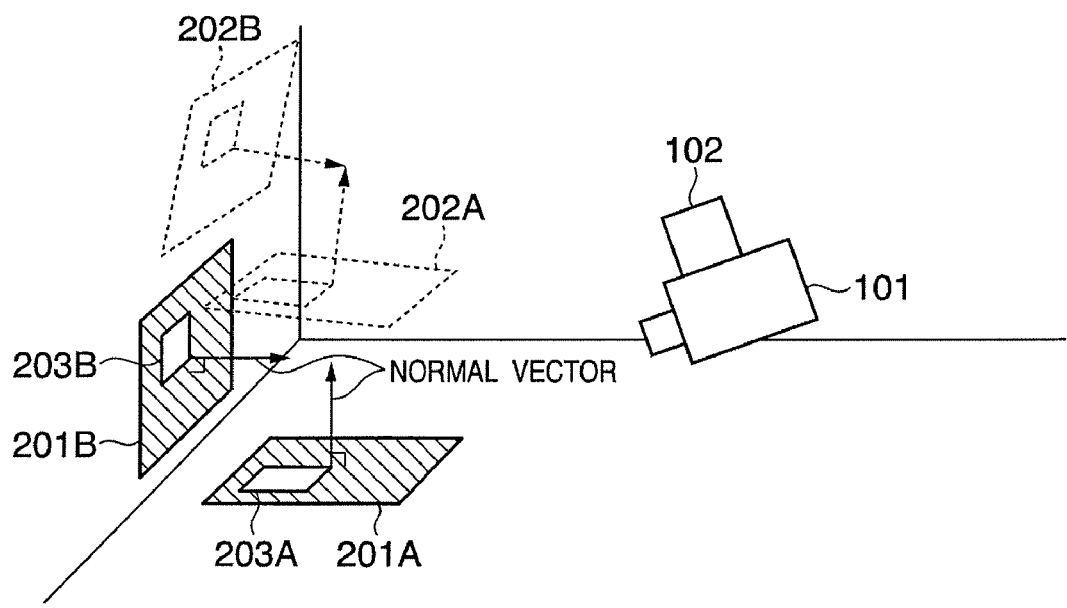
FIG. 2 is a view illustrating a state in which indices used in the first embodiment are laid out on the floor and wall in physical space to be sensed, and are sensed by a camera of the index identification apparatus.

A camera 101 shown in FIG. 2 is a video camera which can sense an image from the physical space, and has, e.g., a CCD, CMOS sensor, or the like as an image sensing element. A three-dimensional (3D) position and orientation sensor 102 using, e.g., a magnetic sensor or the like is fixed to the camera 101. A camera position and orientation measurement unit 103 measures the position and orientation of the camera 101 by driving and controlling the 3D position and orientation sensor 102.

An index information holding unit 106 pre-stores information required to identify an index and to discriminate its directionality for each of the indices located in the physical space. More specifically, this information includes the location position (e.g., the 3D absolute coordinates of the central point), the 3D absolute coordinates of the vertices, the size, and the location and orientation of each index. Also, as such information, information for specifying the directionality of an index (e.g., the ID of a vertex of the index outer shape square closest to the directionality specifying shape), information associated with the directionality specifying shape (information associated with a shape and color), and the like are examples of the pre-stored information. Note that the registration items listed above are merely examples, and information other than those described above may be additionally registered or fewer items may be registered depending on indices and index identification methods to be used.

The camera position and orientation measurement unit 103 supplies the position and orientation values of the camera 101 obtained from the 3D position and orientation sensor 102 to an index coordinate projection calculation unit 107 and the index orientation calculation unit 109. The index coordinate projection calculation unit 107 calculates the projected position of an index, which is likely to be sensed by the camera 101, on the image plane of the camera 101 based on the position and orientation values of the camera 101 and the 3D coordinate information of the index recorded in the index information holding unit 106. An index which is projected onto the image plane (to be also referred to as an image sensing plane hereinafter) will be referred to as a projected index hereinafter.

An index detection unit 104 captures the sensed image of the camera 101, and detects an area which is likely to be an index (to be also referred to as a detected index hereinafter) from the image based on predetermined information such as a color, shape, and the like associated with the index. An index orientation estimation unit 105 calculates an orientation Rcm of the index on a camera coordinate system having the viewpoint position of the camera as an origin based on the coordinates of the square vertices and directionality specifying shape of the detected index on the image, which are obtained by the index detection unit 104. The camera coordinate system is a 3D orthogonal coordinate system which has the image sensing plane as x-y coordinates, and the visual axis as a vector in the negative direction of the z-axis. Note that the position of the index in the camera coordinate system may be calculated simultaneously with calculation of its orientation.

The index orientation calculation unit 109 transforms the orientation of the index in the reference coordinate system, which is recorded in the index information holding unit 106, into that in the camera coordinate system, based on the position and orientation of the camera 101.

An index identification unit 108 identifies the detected index based on:

the projected position of the index obtained by the index coordinate projection calculation unit 107;

the position of the detected index in the image obtained by the index detection unit 104;

the orientation of the detected index obtained from the index orientation estimation unit 105; and the orientation of the index obtained by the index orientation calculation unit 109.

Details of the index identification processing will be described later.

In this embodiment, in order to attain stable identification of indices, the position of the detected index in the image is compared with the index position obtained by making a projection calculation so as to obtain a candidate for identification. However, an identification may be made by a method other than that using the projected position obtained by the index coordinate projection calculation unit 107, and the position in the image obtained by the index detection unit 104. For example, an index may be identified based on the orientation of the detected index obtained from the index orientation estimation unit 105 and that of the index obtained by the index orientation calculation unit 109 without using the information of the position of each index on the image sensing plane.

However, when the information of the index position on the image sensing plane is not used, identification is made based only on the orientation of the index in the camera coordinate system. For this reason, the minimum number of indices that can be located is limited up to 6 (six inclined surfaces) if the total of the orientation measurement precision of the sensor and the orientation estimation precision of the detected index is, e.g., less than ±45°. That is, normals to these six inclined surfaces must be located to make an angle of 90° with each other (i.e., the relative orientation relationship of respective surfaces of a cube). Note that the orientation measurement resolution required to distinguish indices becomes higher as the orientation measurement precision of the sensor and the orientation estimation precision of the detected index are higher, thus increasing the minimum number of indices to be located.

FIG. 2 illustrates a state wherein the indices 201A and 201B are located on the floor and wall in the physical space to be sensed, and are sensed by the camera 101 of the index identification apparatus. As described above, the index information holding unit 106 records the information such as the sizes, locations, and the like of the indices 201A and 201B.

The processing to be executed by the index identification apparatus with the above arrangement will be described below with reference to the flowcharts shown in FIGS. 4A and 4B.

In step S401, the camera position and orientation sensor 102 measures the position and orientation of the camera 101 and sends the measured camera position and orientation to the camera position and orientation measurement unit 103. In step S402, the camera position and orientation measurement unit 103 calculates the viewing transform, also called the viewing transformation, from the position and orientation results of the camera in the form of a 4×4 transformation matrix. Note that the term viewing transformation refers to the coordinate transformation between the camera coordinate system and a reference coordinate system when a coordinate system which is set by being fixed to the real world is used as the reference coordinate system. More specifically, the term viewing transformation refers to the s transformation from the coordinate value in a world coordinate system to that in the camera coordinate system. That is, by calculating the viewing transform, the transformation from the coordinate value in the reference coordinate system to that in the camera coordinate system can be easily calculated.

In step S403, the index coordinate projection calculation unit 107 transforms the positions (coordinates) of the central point and vertices of each index in the reference coordinate system recorded in the index information holding unit 106 into those in the camera coordinate system using the viewing transformation calculated in step S402. Furthermore, the unit 107 calculates the estimated positions (projected coordinates) of the central point and vertices of the index of interest on the image sensing plane by making a perspective projection calculation of the camera 101. Since the individual vertices are respectively recorded in distinction from each other, which of the vertices is projected can be specified even on a projection coordinate system obtained by projecting the individual vertices onto the image sensing plane. Assume that the perspective projection transformation of the camera 101 is uniquely determined by the lens focal length and the principal point (projection center) position of the camera 101, and is calculated in advance.

In step S404, the index orientation calculation unit 109 transforms an orientation Rwm of each index in the reference coordinate system recorded in the index information holding unit 106 into the orientation Rcm in the camera coordinate system using the viewing transformation matrix. In this embodiment, assume that the location and orientation Rwm of an index recorded in the index information holding unit 106 is expressed by a 3×3 matrix. This orientation matrix Rwm in the reference coordinate system is transformed into a 4×4 matrix of homogeneous coordinates to have position components (0, 0, 0), and that matrix is then transformed into the orientation Rcm in the camera coordinate system using the viewing transformation matrix.

Parallel to these processes in steps S401, S402, S403, and S404, those in steps S405 to S408 are executed. In step S405, the camera 101 senses an image of the physical space. In step S406, the index detection unit 104 detects an outer circumscribing square and calculates the vertices and central point of the square as one process for detecting indices from the obtained sensed image. This process may use any method for achieving this goal. For example, the process may use the following method.

The brightness of an index is set to be different from that of the background, and after binarization based on the brightness, a contiguous region is calculated by labeling processing. An outer circumscribing rectangle is detected by piecewise linear approximation of the label outer circumference of the contiguous region. The vertices of the rectangle obtained in this manner are calculated, and the central point is calculated by calculating the intersection of diagonal lines.

Subsequently, as one process for detecting a square index with a directionality specifying shape, in step S407 the index detection unit 104 detects the directionality of an index using the information inside the detected outer circumscribing rectangle. For example, as shown in FIG. 6, points (a', b', c', d') that divide line segments, which connect the four vertices (a, b, c, d) of the outer circumscribing rectangle with a central point O, to 1:2 from the central point to the corresponding vertices are calculated. Furthermore, the brightness values of pixels in the images of these four points are compared to obtain a point having a largely different brightness value. The point (b' in FIG. 6) having a brightness value largely different from other three of the four points results from a square (directionality specifying shape) located at a biased position inside the index, and the directionality of the index detected from the image can be determined by this square.

For example, when "the vertex ID closest to the directionality specifying shape" is used as information required to specify the directionality, the ID of a vertex closest to the point having the largely different brightness value is specified. Let A be the ID of the vertex closest to the directionality specifying shape, and let B, C, and D be other vertices in turn clockwise from A on the image. That is, the vertex IDs of the index outer shape square are associated with the vertices (a, b, c, d) in FIG. 6.

In step S408, a matrix Rcm' of the orientation of the index in the camera coordinate system is calculated from the two-dimensional (2D) coordinate values of the vertices of the detected index on the image, and the directionality of the index (correspondence information of the vertices) obtained in step S407. A method of calculating the orientation in the camera coordinate system based on the 2D coordinate values of four points on a sensed plane is not particularly limited. For example, this embodiment uses a method described in Kato, Billinghurst, Asano, and Tachibana: Augmented Reality System and its Calibration based on Marker Tracking, Transactions of the Virtual Reality Society of Japan vol. 4, no. 4, pp. 607-616, December 1999 (to be described below).

That is, equations of a straight line that passes through A and B, and a straight line that passes through D and C, i.e., the straight lines of two opposing parallel sides from four vertices A, B, C, and D on the image are calculated. Then, an equation of two planes (camera coordinate system) including the two straight lines is obtained using these two straight lines and a perspective projection transformation matrix (calculated in advance) of the camera. An outer product ($N_{AB} \times N_{DC}$) of normal vectors $N_{AB}$ and $N_{DC}$ of the two planes defines a directional vector $U_1$ of the two parallel sides AB and DC in the camera coordinate system.

The same processing applies to the other pair of two opposing parallel sides BC and DA, and an outer product ($N_{BC} \times N_{DA}$) of normal vectors of two planes defines a directional vector $U_2$ of the two parallel sides DB and DA in the camera coordinate system.

Since the directional vectors $U_1$ and $U_2$ of the two neighboring sides of the index are obtained, the outer product direction of the two directional vectors is given by $V_3$. Vectors $V_1$ and $V_2$, which make right angles and have equal change angles from $U_1$ to $V_1$ and from $U_2$ to $V_2$ in a plane having $V_3$ as a vertical axis and including $U_1$ and $U_2$, are determined. At this time, $[V_1{}^t V_2{}^t V_3{}^t]$ defines the orientation Rcm' of the index in the camera coordinate system.

In this way, in steps S401 to S404, the projected coordinates obtained by projecting the vertices and central point of each index held by the index information holding unit 106 onto the image plane, and the orientation Rcm in the camera coordinate system are calculated based on the measurement values of the camera position and orientation sensor 102. In steps S405 to S408, the coordinates of the vertices and central point of the square index detected from the image, and the orientation Rcm' of the detected index in the camera coordinate system are calculated.

Figure 3:
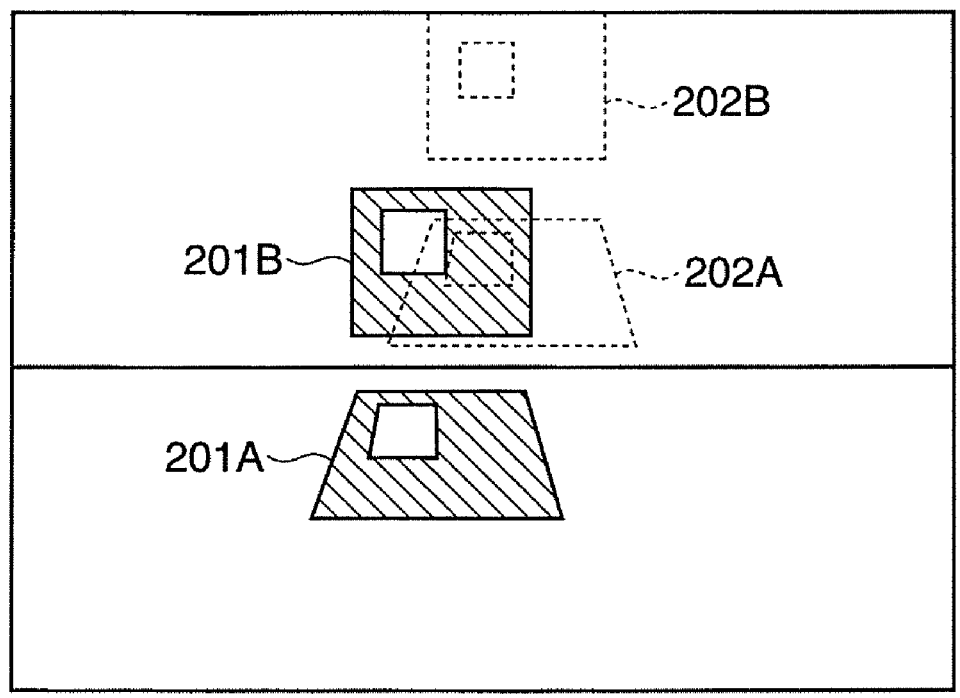
FIG. 3 is a view showing an example of the relationship between the projected coordinates of indices onto the image plane, and indices in the sensed image.

The final processing of this embodiment is to identify each individual index when a plurality of indices, which cannot be distinguished based only on those detected from the sensed image, are still located in the physical space, as shown in FIG. 3. For example, when two indices having the same directionality are located on the wall and floor on the sensed image, as shown in FIG. 3, this embodiment can identify them. Indices 201A and 201B shown in FIG. 3 are those which are obtained by detecting indices located in the physical space from the sensed image. As shown in FIG. 3, these two indices 201A and 201B are located to have different orientations.

At this time, assume that the coordinates of the indices 201A and 201B, which may be included in the visual field of the camera 101, are projected onto the image plane of the camera 101, and are calculated to indicate positions 202A and 202B shown in FIG. 3 in step S403. In this case, in order to identify indices by the method of prior art 2, misidentification occurs, as has been described in the paragraphs of Description of the Related Art. That is, the indices 201B and 202A, whose central points are close to each other, and which have the same directionality are misidentified as corresponding indices.

The steps to solve this problem and to correctly identify indices having different orientations are steps S409 and S410 to be described below.

In step S409, a candidate list of detected indices, which are likely to correspond to projected indices obtained in step S403, is generated based on the distances between the central points of the projected indices obtained in step S403 and those of the indices detected in step S406. This list is a linear list of indices in ascending order of central point distance.

In step S410, the candidate list of the detected indices, which are likely to correspond to the projected indices obtained in step S403, is searched sequentially starting with the first candidate. Then, Rcm obtained in step S404 and Rcm' obtained in step S408 are compared to find indices having similar orientations. Upon discriminating the orientation proximity, a rotating matrix used to transform from Rcm to Rcm' is calculated and is further transformed into the rotation axes and rotation angles, and if the difference between the magnitudes of the rotation angles is equal to or lower than a threshold, it is determined that the proximity is high. Alternatively, Rcm and Rcm' may be transformed into quaternion expressions, and if the distance between points on a four-dimensional spherical plane is equal to or lower than a threshold, it may be determined that the proximity is high. Alternatively, if the distance between singular value vectors obtained by applying singular value decomposition to Rcm and Rcm' is equal to or lower than a threshold, it may be determined that the proximity is high, or whether or not $Rcm \cdot Rcm'^{-1}$ is close to a unit matrix may be evaluated.

The first detected index whose proximity determination result with the projected index exceeds the threshold is determined as a corresponding index.

The processes in steps S409 and S410 will be explained below taking the case of FIGS. 2 and 3 as an example. The process in step S409 lists the detected indices 201A and 201B having a close central point distance as detected index candidates which are likely to correspond to the projected index 202A. Since the detected index 201B has a smaller central point distance with the projected index 202A than the detected index 201A, the detected index 201B is higher in rank than the detected index 201A in the list. Using the list, in step S410 the proximity between the orientations of the projected index 202A and the detected index 201B is checked first, and that between the orientations of the projected index 202A and the detected index 201A is then checked.

As shown in FIG. 2, since the difference between the orientations of the detected index 201B and projected index 202A is large, it is determined that they do not correspond to each other, but the detected index 201A and projected index 202A whose orientations nearly match are associated with each other. At the same time, since the orientation of the erroneously detected index 201B does not match that of the projected index 202A, the probability of misidentification of the erroneously detected index is reduced.

Note that the two processes in steps S409 and S410 are a method of generating a list of the detected indices which may correspond to each projected index with reference to that projected index, and associating the corresponding detected index with the projected index. However, instead, a method of generating a list of projected indices which may correspond to each detected index with reference to that detected index may be used. The present invention is not limited to the method of generating the candidate list simply based on the distances between the indices. Other methods may be adopted as long as a candidate list is generated by methods based on the coordinates of indices on the image plane. Furthermore, in place of the processing sequence for generating the candidate list based on the distances on the image plane first, and then associating indices from the list based on the directionalities of the indices, indices whose directionalities match may be listed up first, and indices in the list may be associated with each other based on their distance on the image plane.

The orientations of indices in the camera coordinate system are calculated in steps S404 and S408, and are compared with each other in step S410. However, the orientations of the indices in the camera coordinate system need not always be calculated, as long as the method can compare the orientation of an index to be projected and the detected orientation. For example, orientations Rmc of the camera on an index coordinate system may be calculated with reference to each index calculated with reference to the index coordinate system in steps S404 and S408, and may be compared with each other. The index coordinate system is, for example, an orthogonal coordinate system, which has the vertex b in FIG. 6 as an origin, a vector be as an X-axis, a normal direction as a Y-axis, and a vector ba as a Z-axis. In this case, a target orientation Rmc is obtained by calculating $Rcm^{-1}$. Note that $Rcm^{-1}$ represents an inverse matrix of the index orientation Rcm in the camera coordinate system. In step S408, an inverse matrix $Rcm'^{-1}$ of Rcm' is calculated.

A camera orientation Rwc in the reference coordinate system may be used as a criterion of comparison. In this case, a camera orientation calculated based on the sensor measurement value is used. In step S408, Rwc is calculated by $Rwm \cdot Rcm'^{-1}$. Note that Wrm is the index orientation in the reference coordinate system, which is recorded in the index information holding unit 106.

In this way, upon identifying the index by comparing the orientations, which of the orientations in which of the coordinate systems is to be used as a reference is not particularly limited, and comparable orientations in a common coordinate system may be used.

As described above, according to this embodiment, since an index is identified using the orientation of the index in the physical space, even when a plurality of identical indices are located, each individual index can be identified. Indices can be identified even if they have different inclinations on the surfaces where they are located, since they can be identified based on their orientation differences even if they have an identical directionality, thus greatly relaxing limitations on the location.

That is, with the method of distinguishing the directionalities on the sensed image in the method of prior art 2, if the total of the orientation measurement precision of the position and orientation sensor and the orientation estimation precision of the detected index is, e.g., less than ±45°, only four different types of indices are located on a region where these indices may be sensed at the same time. That is, these four types include those of the upper, lower, right, and left directions (i.e., four directions obtained when indices are located to be rotated every 90° to have the normal to the index as an axis). However, the index identification apparatus according to this embodiment can locate at least 24 different types (4 directions x 6 inclined surfaces) of indices.

For example, when one index is located on each surface of a cube, if the orientation measurement precision is as high as the total of the measurement precision of the sensor and the estimation precision of the detected index, which is less than ±45°, the respective indices on the surfaces can be distinguished from each other. When the directionalities of indices which appear on the sensed image are used, 90° rotations (four directions) can be distinguished from each other to have the normal to an index on each surface. That is, three different types of indices can be added in addition to the index which is located first on each surface, and a total of 24 indices, i.e., four indices×6 surfaces, can be distinguished from each other.

Also, according to this embodiment, as has been described in the paragraphs of Description of the Related Art, when detection errors shown in FIG. 5 occur, if the printed matter 601 and target index 202A have different orientations, they are not misidentified.

Second Embodiment

The first embodiment has assumed a case wherein indices fixed on in physical space are sensed while the 3D position and orientation sensor is located on the camera and the camera 101 is movable. However, the present invention can be suitably applied to a case wherein a physical object on which the 3D position and orientation sensor and indices are located moves as well as the camera. Note that a 3D position and orientation sensor attached to a physical object will be referred to as an object position and orientation sensor hereinafter. Also, assume that indices used in this embodiment are the same as those used in the first embodiment.

Figure 8:
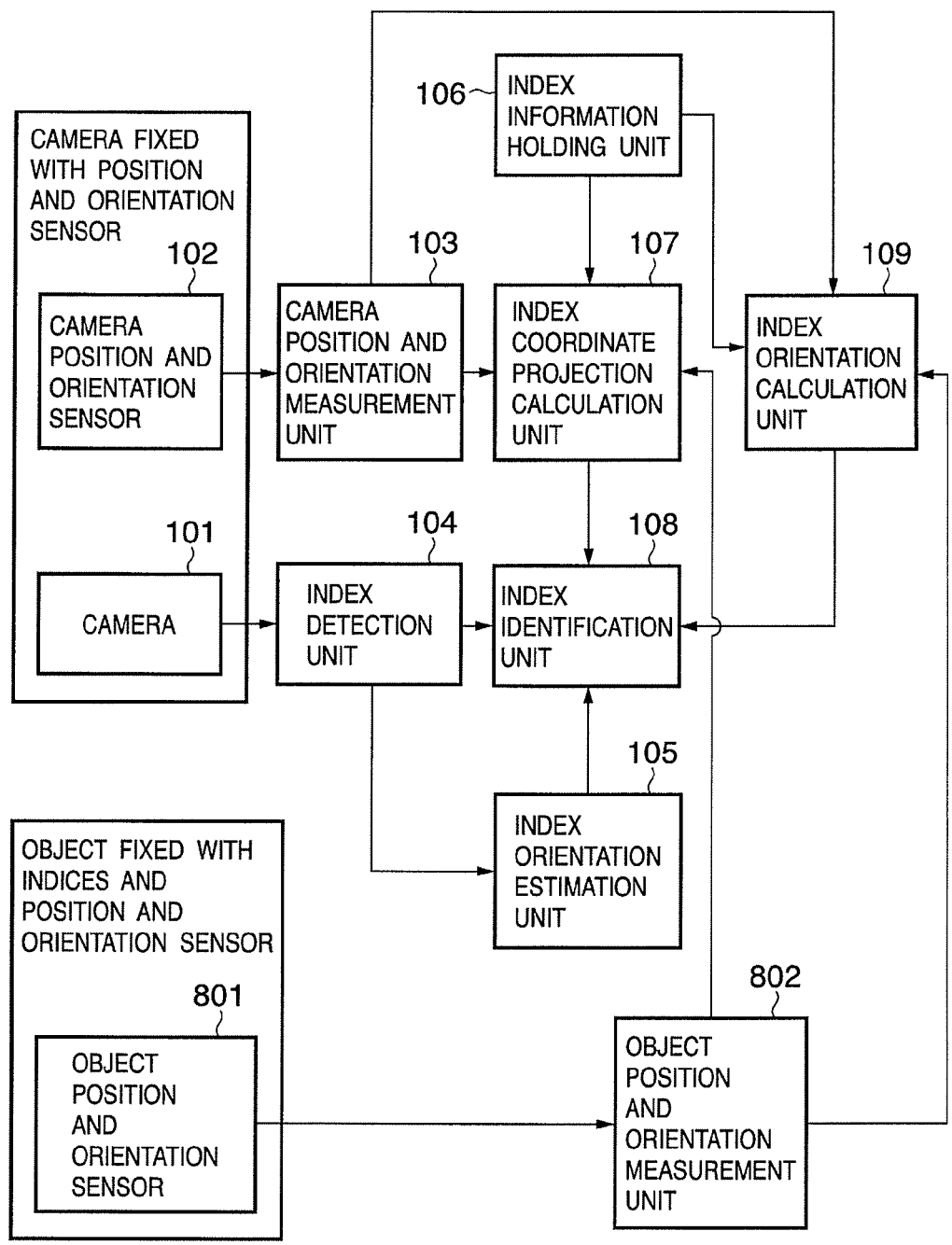
FIG. 8 is a block diagram showing an example of the arrangement of an index identification apparatus according to the second embodiment.
Figure 9:
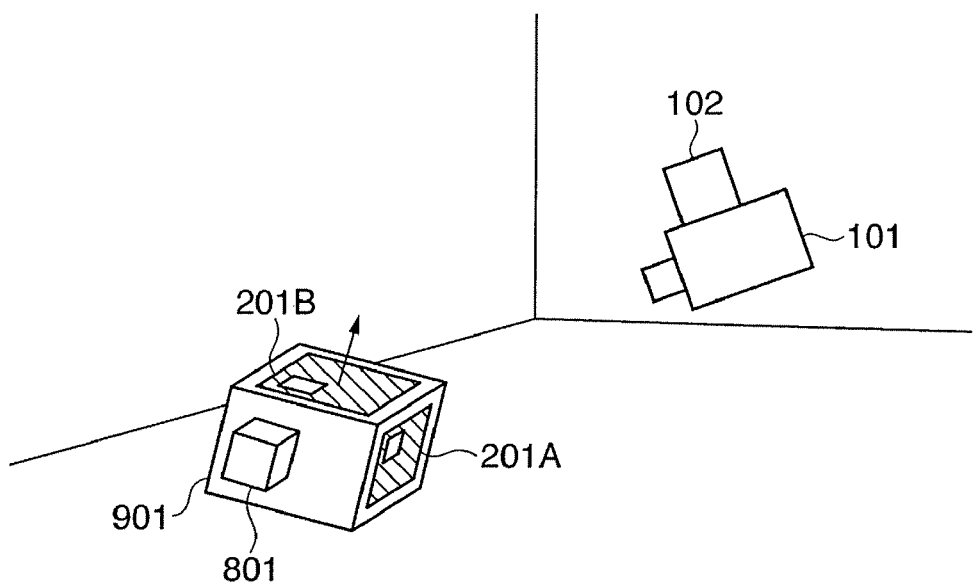
FIG. 9 is a view illustrating the relationship between a camera 101, a camera position and orientation sensor 102, a physical object 901, and an object position and orientation sensor 801 according to the second embodiment.

FIG. 9 illustrates the relationship among the camera 101, the camera position and orientation sensor 102, a physical object 901, and an object position and orientation sensor 801 in this embodiment. FIG. 8 is a block diagram showing an example of the arrangement of an index identification apparatus according to this embodiment.

In this embodiment, the object position and orientation sensor 801 and an object position and orientation measurement unit 802 are added to the arrangement of the first embodiment shown in the block diagram of FIG. 1. Also, the index information holding unit 106 records the positions and orientations of indices in a coordinate system which has the physical object 901 as a reference (to be referred to as an object coordinate system hereinafter) in place of those of the indices in the reference coordinate system.

Also, a process for transforming the positions and orientations of the indices 201A and 201B defined in the object coordinate system into those in the reference coordinate system is added to:

the process for making a projection calculation of the coordinates of the central point and vertices of each indices, which process is executed by the index coordinate projection calculation unit 107; and the process for calculating the orientation of each index in the camera coordinate system, which process is executed by the index orientation calculation unit 109.

Figure 10A:
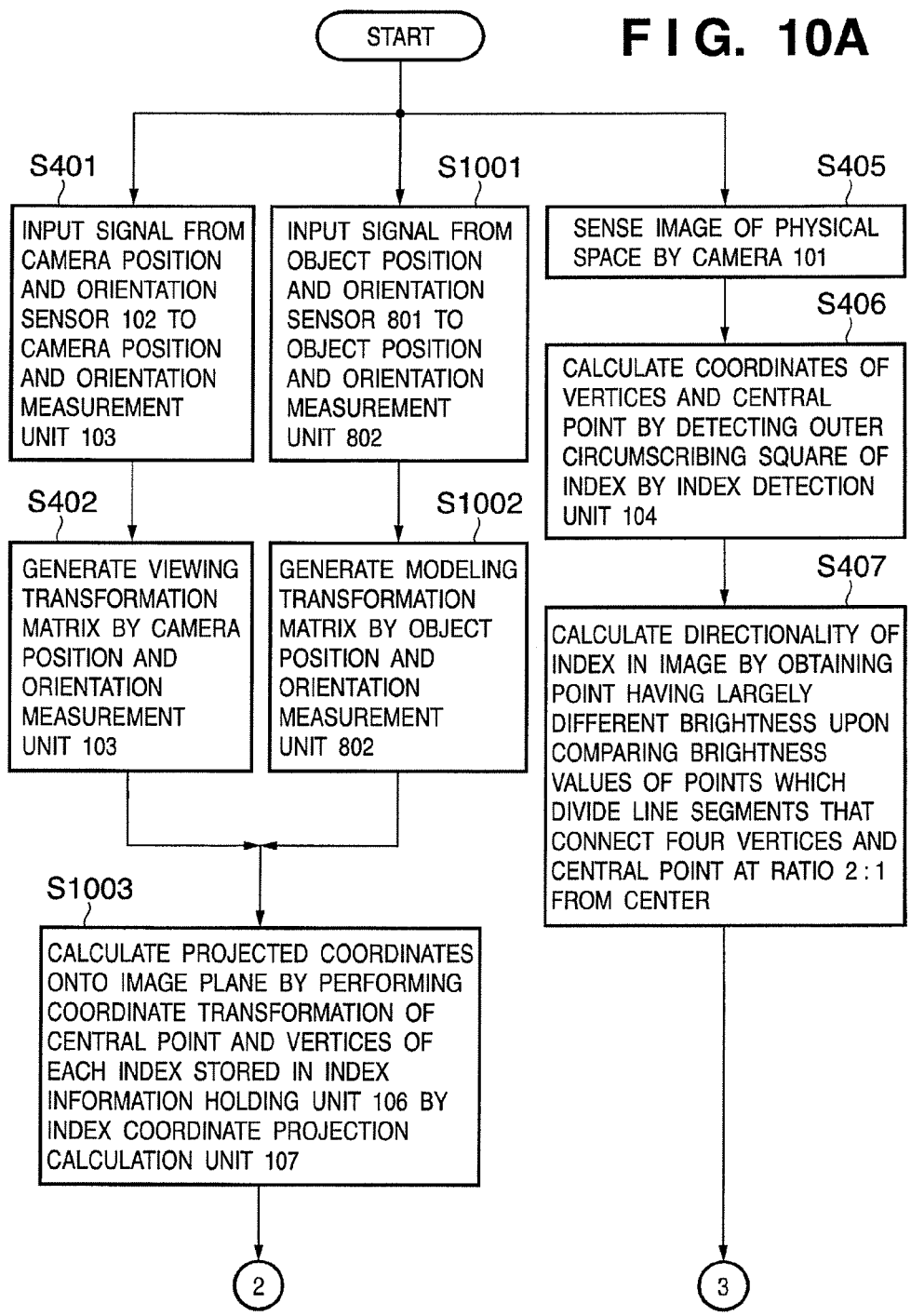
FIGS. 10A and 10B are flowcharts for explaining the processing of the index identification apparatus according to the second embodiment.
Figure 10B:
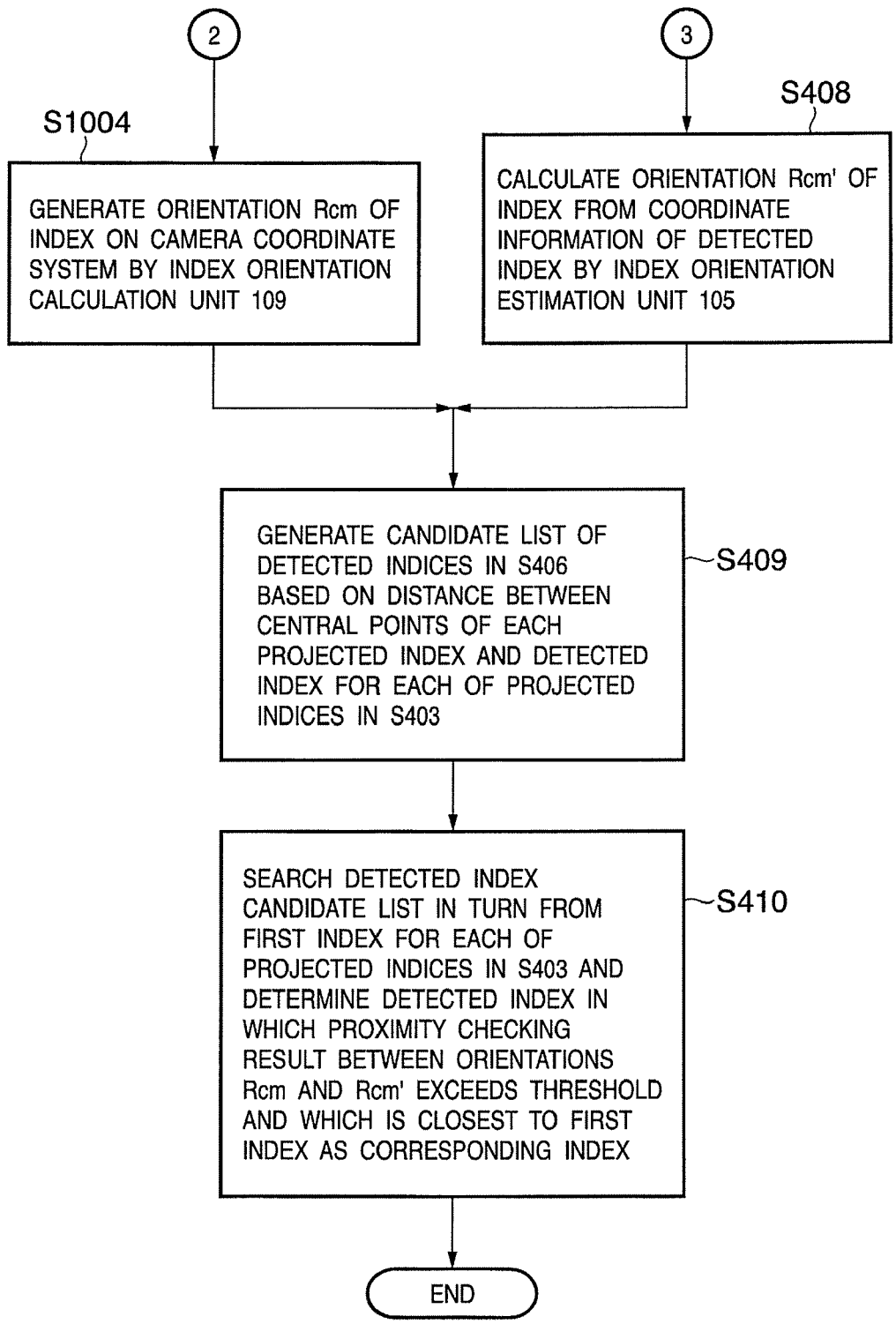

FIGS. 10A and 10B are flowcharts showing the operation of the index identification apparatus of this embodiment.

This embodiment must identify the indices 201A and 201B located on the moving physical object 901 using their orientations in the camera coordinate system. For this purpose, the processes in steps S1001 and S1002 are added to the flowcharts of the first embodiment, and steps S1003 and S1004 replace steps S403 and S404.

In step S1001, the object position and orientation sensor 801 measures the position and orientation of the physical object 901, and sends them to the object position and orientation measurement unit 802.

In step S1002, the object position and orientation measurement unit 802 computes the modeling transform in the form of a 4×4 transformation matrix based on the position and orientation of the physical object 901 measured in step S1001. The term modeling transformation refers to the coordinate transformation between the reference coordinate system and object coordinate system, i.e., the transformation for transforming a point in the object coordinate system into that in the reference coordinate system.

In step S1003, the index coordinate projection calculation unit 107 transforms the positions (coordinates) of the central points and vertices of respective indices on the object coordinate system, which are recorded in the index information holding unit 106 into those in the reference coordinate system using the modeling transformation obtained in step S1002. Furthermore, the index coordinate projection calculation unit 107 transforms these positions into those in the camera coordinate system using the viewing transformation obtained in step S402, and calculates estimated positions (projected coordinates) of these positions on the image sensing plane by making the perspective projection transformation calculation of the camera 101.

In step S1004, the index orientation calculation unit 109 transforms an orientation Rom of each index in the object coordinate system, which is recorded in the index information holding unit 106, into an orientation Rwm (=Rwo·Rom) of the index in the reference coordinate system using the modeling transformation obtained in step S1002. Furthermore, the index orientation calculation unit 109 calculates an orientation Rcm of each index in the camera coordinate system using the viewing transformation obtained in step S402. Note that Rwo indicates the orientation component of the physical object. That is, let Rwc be the orientation component of the camera. Then, Rcm is given by:

$$Rcm = Rwc^{-1} \cdot Rwo \cdot Rom \qquad (1)$$

Since other steps in FIGS. 10A and 10B are processed in the same manner as in the first embodiment, indices can be identified using the orientations.

As described above, according to this embodiment, even when the physical object on which the 3D position and orientation sensor and indices are located moves, the indices can be stably and precisely detected as in the first embodiment.

<First Modification>

In the first embodiment, the camera is movable, and the object is fixed, and in the second embodiment, the camera and object are movable. Alternatively, the present invention can be applied to an environment in which the camera is fixed to the physical space, and the object is movable.

Figure 11:
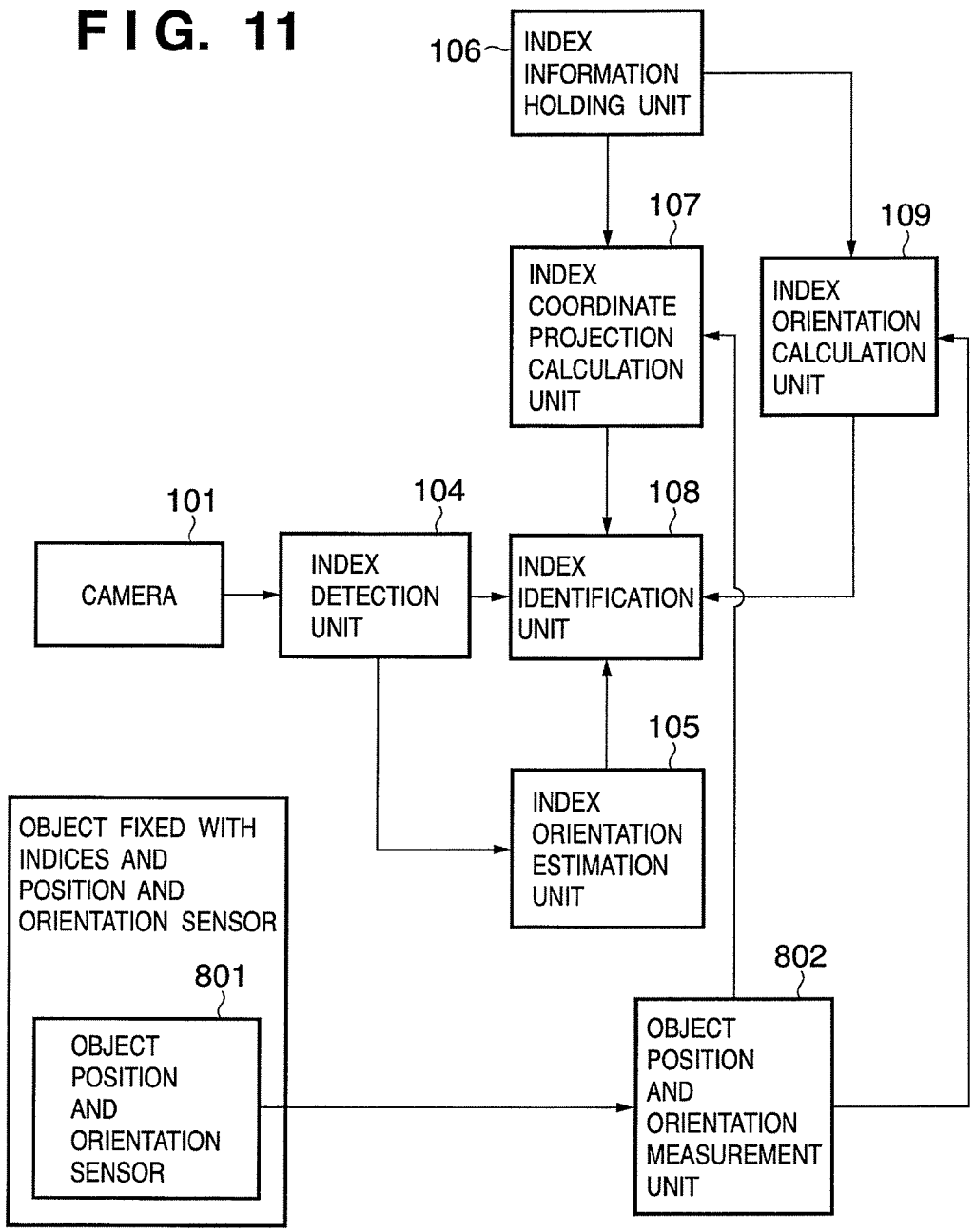
FIG. 11 is a block diagram showing an example of the arrangement of an index identification apparatus according to the first modification.

FIG. 12 shows the relationship among the camera 101, physical object 901, and physical position and orientation sensor 801 in this modification. FIG. 11 is a block diagram showing an example of the arrangement of the index identification apparatus according to this modification. The arrangement of this modification is substantially the same as that of the second embodiment shown in FIG. 8, except that the camera position and orientation sensor 102 and camera position and orientation measurement unit 103 are omitted.

In this modification, in the processing for measuring the camera position and orientation in step S401 in FIG. 10A that shows the flowchart of the processing in the second embodiment, the fixed camera position and orientation values, which are separately recorded in advance, are output instead. Other steps can be carried out in the same manner as in the second embodiment.

<Second Modification>

In the second embodiment, the 3D position and orientation sensors are respectively attached to the camera and physical object to measure their positions and orientations. However, the present invention is not limited to the use of the 3D position and orientation sensors to identify indices, but a measuring instrument that measures the orientation in the reference coordinate system can be applied. For example, orientation sensors each of which comprises a gyro sensor and the like may be attached to the camera and physical object to measure their orientations, thus identifying indices.

Figure 13:
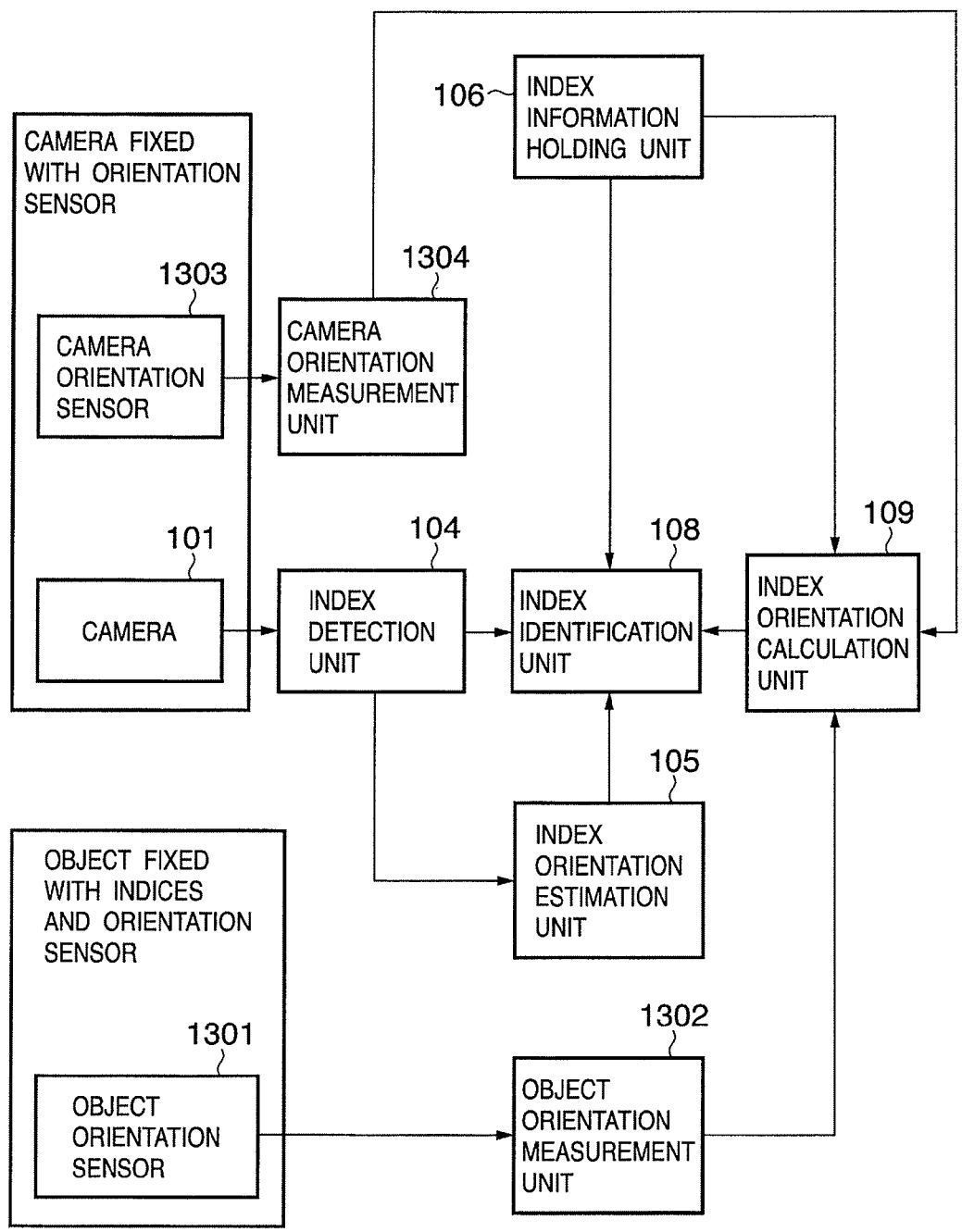
FIG. 13 is a block diagram showing an example of the arrangement of an index identification apparatus according to the second modification.

FIG. 13 is a block diagram showing an example of the arrangement of the index identification apparatus of this modification. The example of the arrangement of this modification is substantially the same as that of the second embodiment, except that components 1301, 1302, 1303, and 1304 required to measure the orientations replace the components 102, 103, 801, and 802 required to measure the positions and orientations, and the index coordinate projection calculation unit 107 is omitted.

An object orientation sensor 1301 and a camera orientation sensor 1303 are orientation measuring instruments used to measure the orientations of objects to be measured. This modification uses a gyro sensor-based sensor unit, e.g., InertiaCube2 available from InterSense, Inc. U.S.A. The orientation measurement values of these gyro sensors are respectively output to an object orientation measurement unit 1302 and a camera orientation measurement unit 1304.

The object orientation measurement unit 1302 supplies the orientation of the object in the reference coordinate system, which is measured by the object orientation sensor 1301, to the index orientation calculation unit 109.

The camera orientation measurement unit 1304 supplies the orientation of the camera in the reference coordinate system, which is measured by the camera orientation sensor 1303, to the index orientation calculation unit 109.

Figure 14:
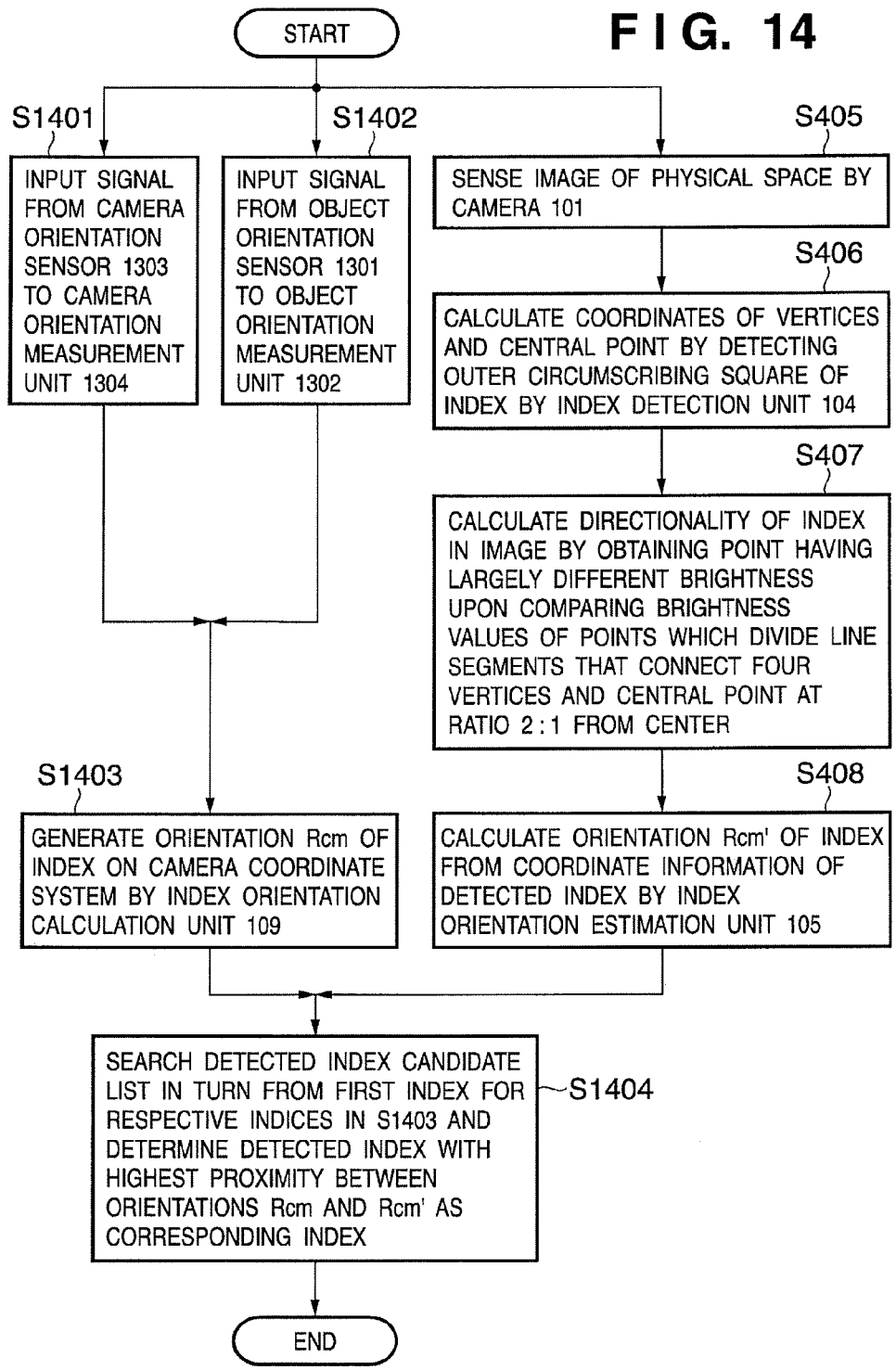
FIG. 14 is a flowchart for explaining the processing of the index identification apparatus according to the second modification.

FIG. 14 is a flowchart showing details of the processing of the index identification apparatus according to this modification. In FIG. 14, since the processing for calculating the orientation Rcm' of each index from the sensed image is common to that in the first or second embodiment, it is denoted by the same step numbers.

In step S1401, the camera orientation sensor 1303 measures a camera orientation Rwc in the reference coordinate system, and sends the measurement result to the camera orientation measurement unit 1304.

In step S1402, the object orientation sensor 1301 measures an orientation Rwo of the physical object in the reference coordinate system, and sends the measurement result to the object orientation measurement unit 1302.

In step S1403, the index orientation calculation unit 109 calculates the orientation Rcm of each index in the camera coordinate system by:

$$Rcm = Rwc^{-1} \cdot Rwo \cdot Rom \quad (2)$$

where Rwc and Rwo are the orientations of the camera and object in the reference coordinate system, which are measured in steps S1401 and S1402, respectively, and Rom is the orientation of each index defined in the object coordinate system, which is recorded in the index information holding unit 106.

On the other hand, in steps S405 to S408, the orientation Rcm' of each detected index in the camera coordinate system is calculated from the image sensed by the camera 101 as described in the first embodiment.

In step S1404, a detected index candidate list stores all the detected indices detected from the image by the processing in steps S405 to S408 in the order they are detected. Furthermore, the index identification unit 108 checks the proximity between the orientation Rcm of each index in the camera coordinate system, which is held by the index information holding unit 106 and the orientation of each detected index (obtained in step S408) in the detected index candidate list, thus associating them with each other.

However, this modification does not rank the detected indices in the detected index candidate list. For this reason, the proximity checking processing checks the proximities with all the indices in the candidate list and identifies an index with the highest proximity as a corresponding index in place of searching indices sequentially from the first one, and associating an index which falls within a threshold range first. The proximity checking processing at this time may calculate the absolute value of the difference between, e.g., a matrix formula Rcm·Rcm'$^{-1}$ and 1, and may use its reciprocal number as the proximity. Alternatively, the processing may calculate a rotating matrix that transforms from Rcm to Rcm', may further transform the matrix into a rotation axis and rotation angle, and may determine the reciprocal number of the magnitude of the rotation angle as the proximity.

Other steps can be carried out in the same manner as in the second embodiment.

Since an orientation sensor such as InertiaCube2 or the like has drift errors accumulated along with an elapse of time, the orientation measurement value to be output may often indicate an orientation having errors and which is different from the true orientation. In order to cope with misidentification of an index due to errors, the azimuths as rotations about the barycentric directions of Rcm and Rcm' as axes may be ignored, and the orientations of the angles of inclination (rotations about two axes) may be compared in step S1404 in FIG. 14. In order to compare the orientations in the inclination directions, only an inclination component is acquired from at least one of the orientation values output from the object orientation sensor 1301 and camera orientation sensor 1303 in step S1401 or S1402. Then, an azimuth component is overwritten with a prescribed value (e.g., 0° or the like) to transform into a matrix that represents an orientation. Also, the orientation Rcm' of each index which is obtained from the sensed image in steps S405 to S408 is segmented into the azimuth and angle of inclination, and the azimuth is overwritten with the same prescribed value to transform into a matrix that represents an orientation. As a result, identification can be attained based only on the angles of inclination of the two orientations to be compared.

In addition to the method of ignoring the azimuth by overwriting it with the prescribed value, a method of correcting the azimuth based on an index in the previous frame of the sensed image, and using a current azimuth predicted from that correction value may be used.

<Third Modification>

In the above embodiments and modifications, a directional square index is identified, as described in prior art 2. However, the present invention is not limited to identification of such a specific index. The present invention can identify an arbitrary index which has a shape having at least one plane, also has information indicating its directionality, and allows calculation of its orientation from an image obtained by sensing that index. Note that the shape having one plane is a shape having three or more vertices on one plane or a combination of such shapes in case of an index characterized by the vertices of a figure as a feature in an image.

For example, as described in the above Rekimoto's reference, an index having an ID code in a square may be used. This index holds a "2D barcode" (to be simply referred to as a code hereinafter) based on a 5×5 black and white rectangular matrix in a code area inside the index. Therefore, $2^{16}$ different types of indices are theoretically identifiable. However, when the index appears with a small size in the sensed image, the code may be misidentified or not identifiable at all. To solve such a problem, the number of divisions of the code area in the square shape may be reduced to 3×3 or the like. However, when the number of divisions of the code area is reduced, the number of identifiable indices is reduced, thus posing another problem.

Upon applying the index identification apparatus according to this modification, not only identification from the code but also that based on the orientation difference can be implemented. Hence, if indices are located to have different orientations, those which have an identical code can be used in a region where these indices are sensed at the same time. For this reason, even when the number of divisions of the code area is reduced, the number of types of identifiable indices can be increased compared to the prior art. For example, if the total of the orientation measurement precision of the orientation sensor and the orientation estimation precision of the detected index is less than ±45°, since indices having an identical code can be located on four directions × six inclined surfaces, the number of identifiable indices can be increased to 24. For this reason, the problem of reduction in the number of identifiable indices, which is posed when the number of divisions of the code area is reduced, can be solved.

Figure 15:
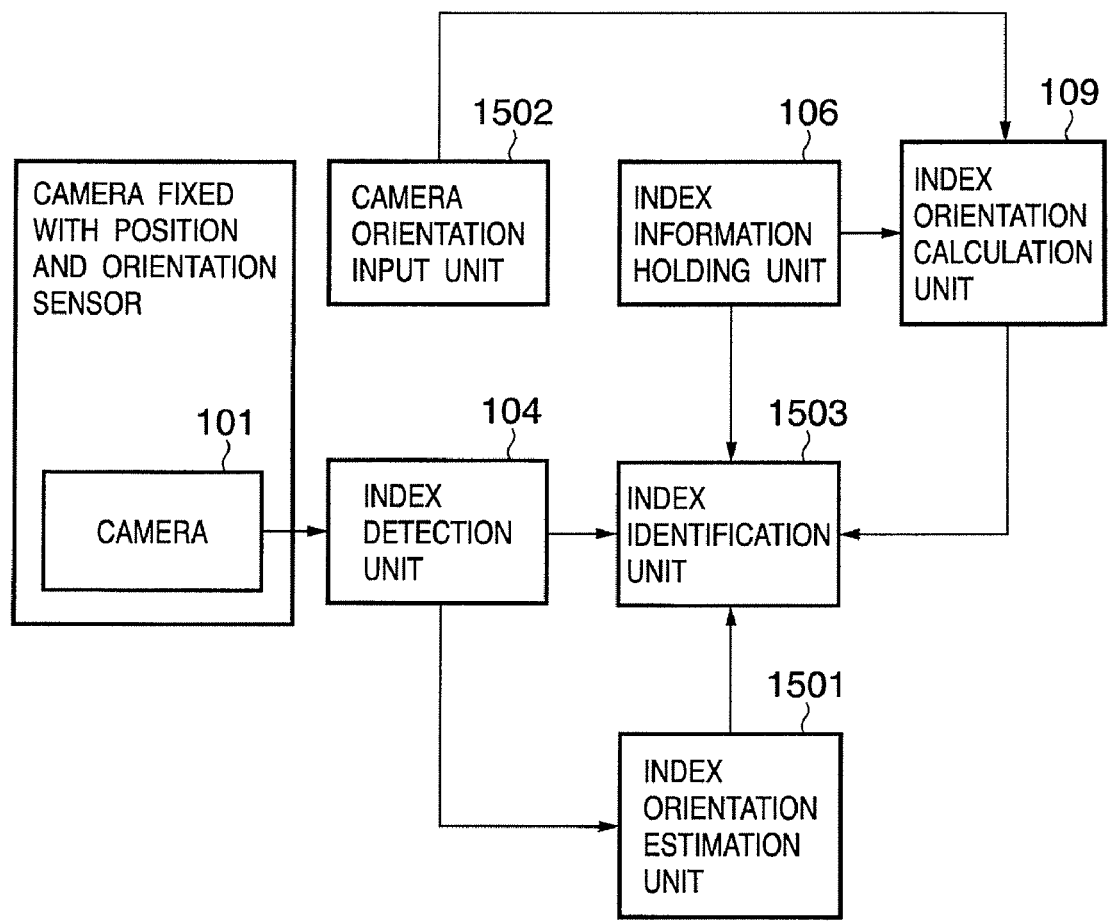
FIG. 15 is a block diagram showing an example of the arrangement of an index identification apparatus according to the third modification.

FIG. 15 is a block diagram showing an example of the arrangement of the index identification apparatus according to this modification. The same reference numerals in FIG. 15 denote the components common to those in the aforementioned embodiments.

An index orientation estimation unit 1501 estimates an orientation Rcm' of each detected index in the camera coordinate system based on the vertex coordinates of the detected index detected from the sensed image and the identification result of a code inside the index.

A camera orientation input unit 1502 receives the orientation of the camera 101 by an arbitrary method, and outputs it to the index orientation calculation unit 109. More specifically, the camera orientation in the reference coordinate system, which is obtained using an index identified in the previous frame of the sensed image, may be used, or a special index which can be solely identified (e.g., a reference index having a unique code, which is different from other indices among a plurality of indices, or the like) may be sensed by the camera 101, and the camera orientation obtained by identifying the reference index may be input.

The index information holding unit 106 records the codes of individual indices in addition to the index information described in the first embodiment.

An index identification unit 1503 reads out code information inside each detected index detected from the image, and identifies the index using the orientation of the index obtained by the index orientation calculation unit 109 and that of the detected index obtained by the index orientation estimation unit 1501.

The processing of the index identification apparatus of this modification will be described below using the flowchart shown in FIG. 16.

In step S1601, the camera orientation input unit 1502 outputs the camera orientation Rwc in the reference coordinate system to the index orientation calculation unit 109.

In step S1602, the index orientation calculation unit 109 transforms the orientation Rwm of each index in the reference coordinate system, which is stored in the index information holding unit 106, into the orientation Rcm in the camera coordinate system, based on the camera orientation Rwc output in step S1601.

In steps S405 and S406, an index is detected from the sensed image, and the coordinates of its vertices and central point are calculated as in the first embodiment.

In step S1603, the index identification unit 1503 applies a transformation that projects the coordinates of the four vertices of the index obtained in step S406 to those of a square to the detected index, and reads out and identifies a code from the obtained image.

In step S1604, the index orientation estimation unit 1501 estimates a normal to each index in the camera coordinate system using the constrained condition that four sides which couple the coordinates of the four vertices obtained in step S406 form a square in the reference coordinate system. Furthermore, the index orientation estimation unit 1501 calculates the orientation Rcm' of the detected index in the camera coordinate system using the relationship among this normal, the directional vectors of the four sides of the index in the camera coordinate system, and the directional vectors of diagonal lines (refer to Junichi Rekimoto, "Matrix: A Real-time Object Identification and Registration Method for Augmented Reality", Proc. of Asia Pacific Computer Human Interaction (APCHI '98), 1998 for a more detailed processing method).

In step S1605, the index identification unit 1503 generates a detected index candidate list of respective indices by listing detected indices having identical codes identified in step S1603 to the respective indices which are transformed into the orientations Rcm in the camera coordinate system in step S1602.

In step S1606, the index identification unit 1503 searches the detected index candidate list generated in step S1605 in turn from the first index, and finds the orientation Rcm' of the detected index which has the highest proximity with the orientation Rcm of the index of interest, thus identifying the index. Alternatively, the index identification unit 1503 determines an index which has an identical code but a low proximity as an index which may be misidentified.

In place of calculating the orientations of all the indices in the camera coordinate system, which are stored in the index information holding unit 106 in the processing in step S1602, the orientations may be calculated only for indices having the codes identified in step S1603, thus reducing the processing load.

<Fourth Modification>

The first and second embodiments identify an index using the orientation of an index having a directionality. However, an index having no directionality may be used as long as its vector, such as a normal vector or the like, which indicates the inclination of the index, can be calculated.

For example, a case will be described below wherein the first embodiment adopts a square index having no directionality specifying shape. The first embodiment uses a square index having a directionality for the purpose of calculating a $3\times 3$ orientation matrix. Alternatively, an index can be identified using a vector (e.g., a normal vector) indicating the inclination of the index, which is smaller by one degree of freedom than the orientation matrix. For example, the first embodiment can identify an index by the following processing.

The index information holding unit 106 records the normal vector (a vector indicated on the index of FIG. 2) of each individual index in place of or in addition to the $3\times 3$ orientation matrix of each individual index.

Figure 4A:
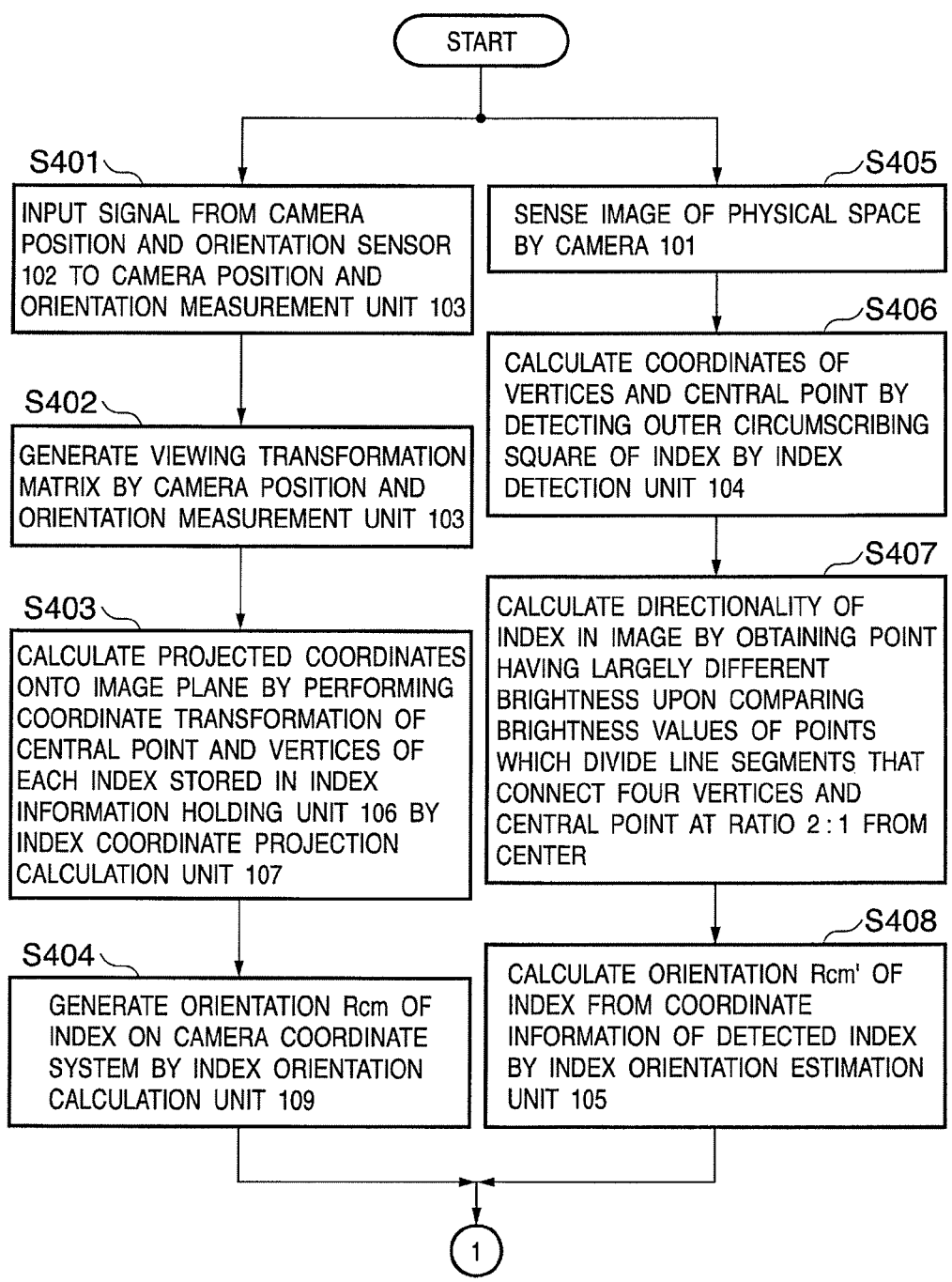
FIGS. 4A and 4B are flowcharts for explaining the processing of the index identification apparatus according to the first embodiment.
Figure 4B:
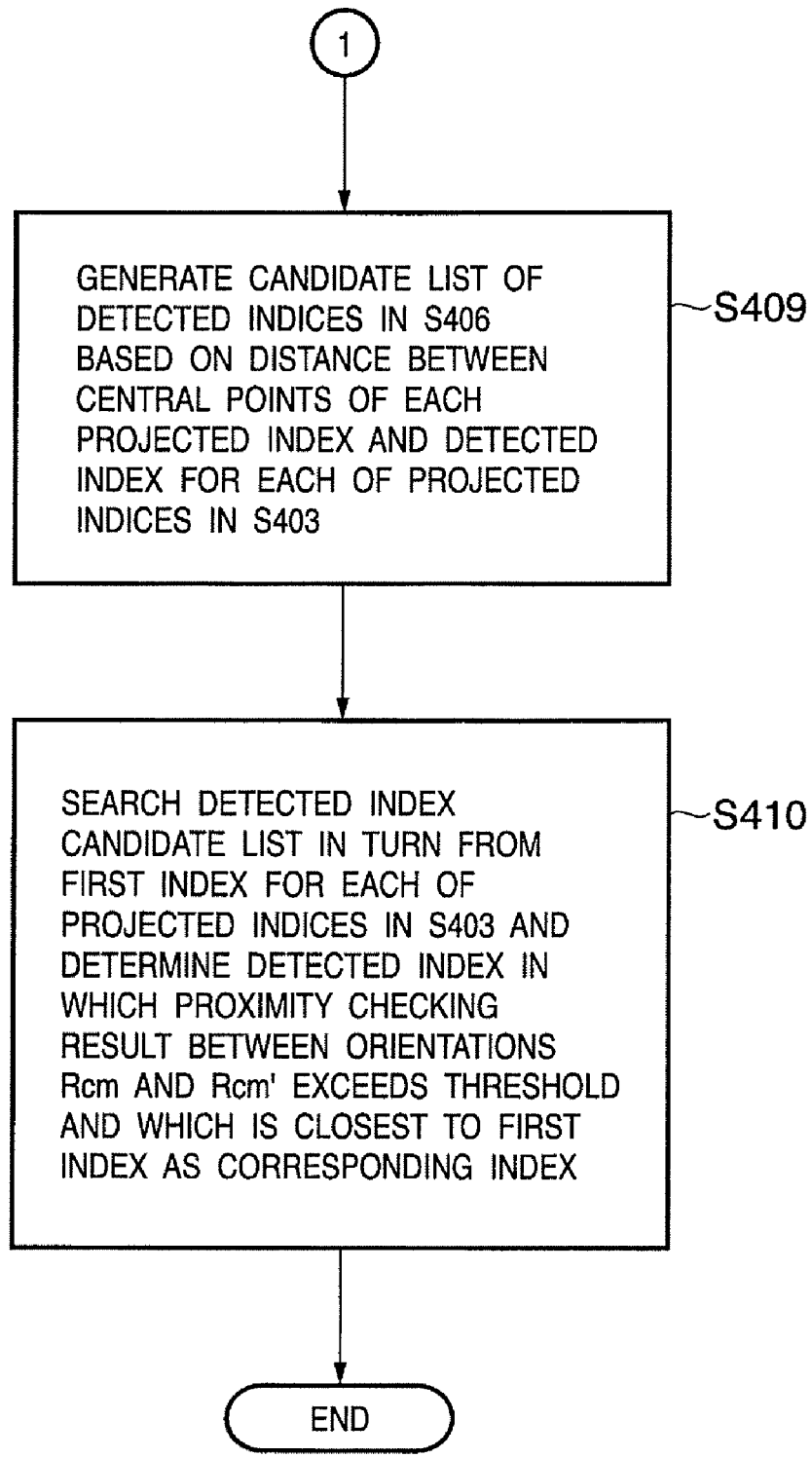

In step S404 in FIG. 4A, the normal vector in the index information holding unit 106 is converted into that in the camera coordinate system. Furthermore, the processing in step S407 is omitted, and in step S408 the normal to an index in the camera coordinate system is calculated from the coordinates of the four vertices of the detected index obtained in step S406. This normal uses $V_3$ calculated in the process of the method described in step S408 of the first embodiment. Furthermore, upon comparing the inclinations of the normal vector of the projected index obtained in step S403 and the normal $V_3$ of the normal vector detected index in step S406 in step S410, the detected index which minimizes the inner product value of these two normals is identified as a corresponding index.

In this manner, by slightly modifying the first embodiment, an index can be identified based on the vector indicating the inclination of the index.

Other Embodiments

The aforementioned embodiments and modifications have explained the index identification apparatus including the camera and the 3D orientation sensor or 3D position and orientation sensor for the sake of understandability. However, these components are not indispensable to the index identification apparatus. That is, an arrangement which performs 3D position and orientation measurement of at least one of the camera and physical object, and image sensing using another apparatus, and receives the measurement result and sensed image from the other apparatus may be adopted. In place of real-time processing, identification processing can be made using the recorded 3D position measurement result and sensed image.

Note that the present invention includes a case wherein the equivalent functions are achieved by executing a software program that implements the functions of the aforementioned embodiments by a system including a computer or a computer of an apparatus. The program is supplied, to the system including the computer or the computer, directly from a recording medium or using wired/wireless communications.

Therefore, the program code itself supplied to and installed in the computer to implement the functional processing of the present invention using the computer implements the present invention. That is, the present invention includes the computer program itself for implementing the functional processing of the present invention.

In this case, the form of the program is not particularly limited, and an object code, a program to be executed by an interpreter, script data to be supplied to an OS, and the like may be used as along as they have the program function.

As the recording medium for supplying the program, for example, magnetic recording media such as a flexible disk, hard disk, magnetic tape, and the like may be used. Also, optical/magneto-optical storage media such as an MO, CD-ROM, CD-R, CD-RW, DVD-ROM, DVD-R, DVD-RW, and the like, a nonvolatile semiconductor memory, and so forth may be used.

As a program supply method using the wired/wireless communications, the following method may be used. That is, a server on a computer network may store a data file (program data file) that can be a computer program which forms the present invention on a client computer. Then, the program data file is downloaded to a client computer that establishes connection to the server. In this case, the program data file may be segmented into a plurality of segment files, which may be allocated on different servers. As the program data file, the computer program itself that forms the present invention, a compressed file including an automatic installation function, or the like may be used.

That is, the present invention includes a server apparatus which allows a plurality of users to download the program data file for implementing the functional processing of the present invention on a computer.

Also, the program may be supplied as follows. That is, a storage medium such as a CD-ROM or the like, which stores the encrypted program of the present invention, may be delivered to the user, and the user who has met a predetermined condition may be allowed to download key information that is used to decrypt the encrypted program via the Internet. In this case, the encrypted program may be executed using that key information to be installed on a computer, thus implementing the present invention.

The functions of the aforementioned embodiments may be implemented not only by executing the readout program code by the computer but also using other programs. For example, the functions of the aforementioned embodiments can be implemented when an OS or the like running on the computer executes some or all of actual processing operations on the basis of an instruction of that program.

Furthermore, the functions of the aforementioned embodiments may be implemented by executing the program read out from the recording medium by a function extension board or a function extension unit, which is inserted into or connected to the computer. More specifically, a memory and CPU of the function extension board or function extension unit execute the program to assume some or all of actual processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-362370, filed on Dec. 15, 2005, which is hereby incorporated by reference herein in its entirety.

What is claimed is:

1. An index identification method comprising:
an image acquisition step, performed by an image acquisition unit, of acquiring a sensed image obtained by sensing an image of physical space in which a plurality of indices are located on a physical object;
an index detection step, performed by an index detection unit, of detecting at least one index from the sensed image;
a first orientation estimation step, performed by a first orientation estimation unit, of estimating an orientation of the detected index using the sensed image;
an orientation information acquisition step, performed by an orientation information acquisition unit, of acquiring a measurement result of measuring an orientation of at least one of an image sensing device used to sense the image and the physical object;
a second orientation estimation step, performed by a second orientation estimation unit, of estimating an orientation of at least one index based on the orientation measurement result of measuring the orientation of at least one of the image sensing device and the physical object acquired in the orientation information acquisition step, and information on the plurality of indices stored in a storage device; and
an index identification step, performed by an index identification unit, of identifying to which of the indices stored in the storage device the detected index corresponds using at least the orientation of the detected at least one index estimated in the first orientation estimation step and the orientation estimated in the second orientation estimation step.

2. The method according to claim 1, further comprising a position information acquisition step of acquiring a measurement result of measurement of a position of the image sensing device, and
wherein the second orientation estimation step includes a step of calculating coordinates of an index projected into the sensed image based on the measurement results of the position and the orientation of the image sensing device, and the information on the plurality of indices stored in the storage device, and estimating the orientation for the index detected in the index detection step whose distance from the projected coordinates is not more than a predetermined value.

3. The method according to claim 1, wherein the index identification step includes a step of making the identification based on the proximity between the orientation estimated in the first orientation estimation step and the orientation estimated in the second orientation estimation step.

4. The method according to claim 3, wherein the proximity is calculated based on the magnitude of a rotation angle upon expressing a relationship between the orientation estimated in the first orientation estimation step and the orientation estimated in the second orientation estimation step as a combination of a rotation axis and the rotation angle.

5. The method according to claim 1, wherein the orientation information acquisition step includes a step of acquiring the measurement result from an orientation measurement device that measures the orientation using an orientation sensor.

6. The method according to claim 1, wherein the index identification step includes a step of identifying the index by comparing an angle of inclination obtained by excluding an azimuth from the orientation estimated in the second orientation estimation step with an angle of inclination obtained by excluding an azimuth from the orientation estimated in the first orientation estimation step.

7. A computer-readable recording medium storing a computer program for causing a computer execute an index identification method according to claim 1.

8. An index identification apparatus comprising:
   an image acquisition unit which acquires a sensed image obtained by sensing an image of physical space in which a plurality of indices are located on a physical object;
   a storage unit which stores information of the plurality of indices;
   an index detection unit which detects at least one index from the sensed image;
   a first orientation estimation unit which estimates an orientation of the detected index using the sensed image;
   an orientation information acquisition unit which acquires a measurement result of measuring an orientation of at least one of an image sensing device used to sense the image and the physical object;
   a second orientation estimation unit which estimates the orientation of at least one index based on the orientation measurement result of measuring the orientation of the at least one of the image sensing device and the physical object acquired by said orientation information acquisition unit, and information of the plurality of indices stored in said storage unit; and
   an index identification unit which identifies to which indices stored in said storage unit the detected index corresponds using at least the orientation of the detected index estimated by said first orientation estimation unit and the orientation estimated by said second orientation estimation unit.

* * * * *